US012620409B2

(12) United States Patent
Lagos et al.

(10) Patent No.: US 12,620,409 B2

(45) Date of Patent: May 5, 2026

(54) SYSTEM AND METHOD FOR FINE-TUNING AN EXISTING MACHINE LEARNING MODEL USING OUT-OF-DOMAIN DATA

(71) Applicant: Naver Corporation, Gyeonggi-do (KR)

(72) Inventors: Nikolaos Lagos, Grenoble (FR); Ioan Calapodescu, Grenoble (FR)

(73) Assignee: Naver Corporation, Gyeonggi-do (KR)

( * ) Notice: Subject to any disclaimer, the term of this patent is extended or adjusted under 35 U.S.C. 154(b) by 136 days.

(21) Appl. No.: 18/780,260

(22) Filed: Jul. 22, 2024

(65) Prior Publication Data

US 2026/0024544 A1 Jan. 22, 2026

(51) Int. Cl.
*G10L 25/30* (2013.01)

(52) U.S. Cl.
CPC .................................... *G10L 25/30* (2013.01)

(58) Field of Classification Search
CPC ...................................................... G10L 25/30
USPC ......................................................... 704/200
See application file for complete search history.

(56) References Cited

U.S. PATENT DOCUMENTS

2020/0135052 A1* 4/2020 Singh ...................... A63F 13/52
2021/0034965 A1* 2/2021 Tan ......................... G06F 17/16
2021/0118465 A1* 4/2021 Rentoumi ............ A61B 5/7475
2021/0157983 A1* 5/2021 Kalluri .................. G06F 40/216
2021/0264300 A1* 8/2021 Staudinger ........... G06V 10/762
(Continued)

OTHER PUBLICATIONS

Amodei, D. et al. "Deep Speech 2: End-to-End Speech Recognition in English and Mandarin", Proceedings of the 33rd International Conference on Machine Leaning, NY NY 2016.
(Continued)

*Primary Examiner* — Tung T Vo
(74) *Attorney, Agent, or Firm* — Mughal Gaudry & Franklin PC

(57) ABSTRACT

Systems, methods, and computer-readable media are provided for accessing out-of-domain training data that includes items of non-textual digital media content. Each of the items is labeled with text and background characteristic(s) that indicate an origination category of candidate origination categories for the item. A pre-trained model is used to generate vector embeddings of the out-of-domain training data and a particular vector embedding of a particular item of in-domain data that is labeled with text but is not labeled with any background characteristic(s) that indicate any origination categories. The generated vector embeddings are used to train another machine learning model to predict the background characteristic(s) based on vector embeddings of non-textual digital media content. The other machine learning model is further used to determine out-of-domain vector embeddings corresponding to the vector embeddings of the out-of-domain training data and in-domain vector embedding(s) corresponding to the in-domain data. Distances are determined between out-of-domain and in-domain vector embedding(s). Based on the distances, a textual content generation model is tuned on item(s) of the out-of-domain data. The item(s) of out-of-domain data to use for tuning may be selected and/or ordered based on the distances. A resulting model may be stored and used to transform unlabeled item(s) of non-textual content to textual content.

24 Claims, 10 Drawing Sheets

(56) References Cited

U.S. PATENT DOCUMENTS

| | | | | |
|---|---|---|---|---|
| 2021/0303798 | A1* | 9/2021 | Duong | G06F 40/35 |
| 2021/0390269 | A1* | 12/2021 | Rezagholizadeh | G06F 40/58 |
| 2022/0075953 | A1* | 3/2022 | Khetan | G06N 3/04 |
| 2022/0201121 | A1* | 6/2022 | Kane | G10L 25/30 |
| 2022/0335925 | A1* | 10/2022 | Zhou | G10L 13/033 |
| 2023/0031738 | A1* | 2/2023 | Zheng | G06F 40/129 |
| 2023/0260536 | A1* | 8/2023 | Xu | G06F 40/30<br>704/231 |
| 2023/0386476 | A1* | 11/2023 | Gurbani | G10L 17/12 |
| 2023/0395075 | A1* | 12/2023 | Li | G10L 15/1815 |
| 2023/0419989 | A1* | 12/2023 | Gfeller | G10L 15/16 |
| 2024/0003737 | A1* | 1/2024 | Wichern | G01H 3/08 |
| 2024/0160900 | A1* | 5/2024 | Smith | G06N 3/047 |
| 2024/0185832 | A1* | 6/2024 | Guan | G06T 17/20 |
| 2024/0212327 | A1* | 6/2024 | Geng | G06F 40/284 |
| 2024/0355063 | A1* | 10/2024 | Zhou | G06F 16/583 |
| 2024/0386202 | A1* | 11/2024 | Hoffman | G06F 40/30 |
| 2025/0037729 | A1* | 1/2025 | Sun | G10L 21/0232 |
| 2025/0078851 | A1* | 3/2025 | Sharma | G10L 13/047 |
| 2025/0094835 | A1* | 3/2025 | Lowinger | G06N 3/0455 |
| 2025/0095638 | A1* | 3/2025 | Cho | G10L 15/063 |
| 2025/0156707 | A1* | 5/2025 | Hwang | G06N 3/09 |
| 2025/0200428 | A1* | 6/2025 | Jang | G06N 20/00 |
| 2025/0217602 | A1* | 7/2025 | Hou | G06F 40/30 |
| 2025/0238470 | A1* | 7/2025 | Penta | G06F 16/907 |
| 2025/0278616 | A1* | 9/2025 | Wang | G06N 3/0495 |
| 2025/0363996 | A1* | 11/2025 | Bharaj | G10L 17/26 |
| 2025/0391420 | A1* | 12/2025 | Mahajan | G10L 21/0216 |

OTHER PUBLICATIONS

Baevski, A. et al. "wav2vec 2.0: A Framework for Self-Supervised Learning of Speech Recognition", arXiv:2006.11477v3, Oct. 22, 2020.

Bengio, Y. et al. "Curriculum Learning", Proceedings of the 26th International Conference on Machine Learning, Montreal Canada, 2009.

Bukhsh, Z. et al. "On Out-of-Distribution Detection for Audio with Deep Nearest Neighbors", arXiv:2210.15283v2, Feb. 25, 2023.

Chen, G. et al. "GigaSpeech: An Evolving, Multi-domain ASR Corpus with 10,000 Hours of Transcribed Audio", Interspeech 2021, Brno, Czechia, Aug. 30, 2021.

Doulaty, M. et al. "Data-selective Transfer Learning for Multi-Domain Speech Recognition", Interspeech 2015, Sep. 6, 2015, Dresden, Germany.

English, P.C. et al., "Domain-Informed Probing of wav2wev 2.0 Embeddings for Phonetic Features", 19th SIGMORPHON Workshop on Computational Research in Phonetics, Phonology, and Morphology, pp. 83-91, Jul. 14, 2022.

Gandhi, S. et al. "ESB: A Benchmark for Multi-Domain End-to-End Speech Recognition", arXiv:2210.13352v1, Oct. 24, 2022.

Gody, R. et al., "Unsupervised Fine-Tuning Data Selection for ASR Using Self-Supervised Speech Models", arXiv:2212.0166v1, Dec. 3, 2022.

Hacohen, G. et al. "On The Power of Curriculum Learning in Training Deep Networks", arXiv:1904.103626v3, May 29, 2019.

Heo, Hee-Soo et al., "Curriculum learning for self-supervised speaker verification", Interspeech 2023, Aug. 20-24, 2023, Dublin, Ireland.

Hsu, Wei-Ning et al. "HuBERT: Self-Supervised Speech Representation Learning by Masked Prediction of Hidden Units", arXiv:2106.07447v1, Jun. 14, 2021.

Johnson, J. et al. "Billion-scale similarity search with GPUs", arXiv:1702.08734v1, Feb. 28, 2017.

Karakasidis, G. et al. "Comparison and Analysis of New Curriculum Criteria for End-to-End ASR", Interspeech 2022, Sep. 18-22, 2022, Incheon, Korea.

Kuan, J. et al. "Back to the Basics: Revisiting Out-of-Distribution Detection Baselines", Presented in ICML Workshop on Principles of Distribution Shift, 2022, arXiv:2207.03061v1, Jul. 1, 2022.

Lagos, N. "Unsupervised Fine-Tuning Data Selection for ASR Using Self-Supervised Speech Models", retrieved Mar. 1, 2024, 12 pages.

Lagos, N. et al. "Unsupervised Multi-Domain Data Selection for ASR Fine-Tuning", Naver Labs Europe, France.

Li, Q. et al. "Confidence Estimation for Attention-Based Sequence-to-Sequence Models for Speech Recognition", arXiv:2010.11428v2, Oct. 23, 2020.

Park, C. et al. "Unsupervised Data Selection for Speech Recognition with Contrastive Loss Ratios", arXiv:2207.12028v1, Jul. 25, 2022.

Peng, X. et al., "Moment Matching for Multi-Source Domain Adaptation", arXiv:1812.01754, Computer Vision and Pattern Recognition, 2019.

Ramponi, A. et al. "Neural Unsupervised Domain Adaptation in NLP—A Survey", arXiv:2006.00632v2, Oct. 28, 2020.

Ravanelli, M. et al., "SpeechBrain: A General-Purpose Speech Toolkit", arXiv:2106.04624v1, Jun. 8, 2021.

Reddy Indurthi, S. et al., "CLAD-ST: Contrastive Learning with Adversarial Data for Robust Speech Translation", Proceedings of the 2023 Conference on Empirical Methods in Natural Language Processing, pp. 9049-9056, Dec. 6-10, 2023.

Reimers, N. et al., "Sentence-BERT: Sentence Embeddings using Siamese BERT-Networks", arXiv:1908.10084v1, Aug. 27, 2019.

Ristea, N.C. et al., "Self-paced ensemble learning for speech and audio classification", arXiv:2103.11988v2, Jun. 8, 2021.

Roy, S. et al., "Curriculum Graph Co-Teaching for Multi-Target Domain Adaptation", arXiv:2104.00808v1, Apr. 1, 2021.

Shah, J. et al., "What all do audio transformer models hear? Probing Acoustic Representations for language delivery and its structure", arXiv:2101.00387v2, Jul. 12, 2021.

Soviany, P. et al., "Curriculum Learning: A Survey", arXiv.2101.10382v3, Apr. 11, 2022.

Sun, Y. et al., "Out-of-Distribution with Deep Nearest Neighbors", Proceedings of the 39th International Conference on Machine Learning, Baltimore, Maryland, 2022.

Zhan, R. et al., "Meta-Curriculum Learning for Domain Adaptation in Neural Machine Translation", 35th AAAI Conference on Artificial Intelligence (AAA!-21), 2021.

Zhang, X. et al., "Curriculum Learning for Domain Adaptation in Neural Machine Translation", Proceedings of NAACL-HLT 2019, Minneapolis, MN, Jun. 2-Jun. 7, 2019, pp. 1903-1915.

Zheng, S. et al., "Autoencoder-based Semi-Supervised Curriculum Learning for Out-of-domain Speaker Verification", Interspeech 2019, Sep. 15-19, 2019, Graz, Austria, 5 pages.

Zheng, Z. et al., "Unsupervised Active Learning: Optimizing Labeling Cost-Effectiveness for Automatic Speech Recognition", arXiv:2308.14814v1, Aug. 28, 2023.

Hugging Face, "facebook/hubert-large-1s960-ft".

Hugging Face, facebook/wav2vec2-large-1v60.

Hugging Face, facebook/wav2vec2-large-960h-1v60.

Zanon-Boito et al., "mHuBERT-147: A Compact Multilingual HuBERT Model", Naver Labs Europe, arXiv:2406.06371v3, Jun. 2024.

* cited by examiner

SYSTEM AND METHOD FOR FINE-TUNING AN EXISTING MACHINE LEARNING MODEL USING OUT-OF-DOMAIN DATA

FIELD

The present disclosure relates to machine learning and more particularly to systems and methods for using potentially out-of-domain data based on limited in-domain data to fine-tune an existing machine learning model to perform a task.

BACKGROUND

Machine learning models are often trained or tuned on data in the same subject matter or content domain as the production data ("the target domain"), to promote the best predictions or decision-making by the machine learning model in the target domain even if the specific combinations of values provided to the model have never been seen before. In some scenarios, training data might not be available in the target domain as the model is used to face new problems, old problems but involving different actors, circumstances, or topics, or problems for which production-quality data is not available.

In many scenarios where training data in the target domain is not available, machine learning models are trained and/or tuned on large sets of training data that are not domain-specific. These general-purpose models may perform well enough in some scenarios, but the general-purpose models can only go so far in certain domains. Without sufficient training data, if the general-purpose model does not provide accurate-enough predictions, an organization may undergo considerable expense to generate new training data for the target domain. Even if the organization is willing to spend considerable time and resources to generate new training data, such training data may have problems due to lack of full coverage of the target domain such as by failing to address edge cases that appear more frequently than expected in the target domain, undetected quality issues that prevent such training data from being used effectively by models, and/or due to other unintended biases introduced by the organization.

Without high-quality training data in a target domain, a poorly performing model might result in poor outcomes for the organization with little practical opportunity for improving those outcomes.

BRIEF SUMMARY

In some embodiments, a computer-implemented method includes accessing out-of-domain training data that includes items of non-textual digital media content. Each of the items is labeled with text and background characteristic(s) that indicate an origination category of candidate origination categories for the item. A pre-trained model is used to generate vector embeddings of the out-of-domain training data and a particular vector embedding of a particular item of in-domain data that is labeled with text but is not labeled with any background characteristic(s) that indicate any origination categories. The generated vector embeddings are used to train another machine learning model to predict the background characteristic(s) based on vector embeddings of non-textual digital media content. The other machine learning model is further used to determine out-of-domain vector embeddings corresponding to the vector embeddings of the out-of-domain training data and in-domain vector embedding(s) corresponding to the in-domain data. Distances are determined between out-of-domain and in-domain vector embedding(s). Based on the distances, a textual content generation model is tuned on item(s) of the out-of-domain data. The item(s) of out-of-domain data to use for tuning may be selected and/or ordered based on the distances. A resulting model may be stored and used to transform unlabeled item(s) of non-textual content to textual content.

In one embodiment, a computer-implemented method includes accessing a set of training data comprising a plurality of items of non-textual digital media content. Each item of the plurality of items of non-textual digital media content is labeled with corresponding textual content and one or more background characteristics that indicate an origination category of a plurality of candidate origination categories of the item of non-textual digital media content. The computer-implemented method further includes using one or more pre-trained machine learning models to generate vector embeddings of the set of training data. The generated vector embeddings are used to train another machine learning model to predict the one or more background characteristics based on vector embeddings of non-textual digital media content. The one or more pre-trained machine learning models are further used to generate a particular vector embedding that represents one or more particular items of non-textual digital media content other than the plurality of items of non-textual digital media content. Each particular item of the one or more particular items is labeled with corresponding textual content but not with any background characteristics that indicate any of the plurality of candidate origination categories of the particular item of non-textual digital media content. The other machine learning model is further used to determine at least a first set of vector embeddings corresponding to the vector embeddings of the set of training data and a second particular vector embedding corresponding to the particular vector embedding that represents the one or more particular items of non-textual digital media content. The first set of vector embeddings comprises a first vector embedding corresponding to a vector embedding of one or more first items of the plurality of items and a second vector embedding corresponding to a vector embedding of one or more second items of the plurality of items. The computer-implemented method further includes determining a first distance between the second particular vector embedding and the first vector embedding and a second distance between the second particular vector embedding and the second vector embedding. Based at least in part on the first distance and the second distance, the computer-implemented method generates a first tuned textual content generation model at least in part by tuning a textual content generation model on the one or more first items including first corresponding textual content of the one or more first items. The computer-implemented may store a particular tuned textual content generation model based at least in part on the first tuned textual content generation model, and use the particular tuned textual content generation model to transform one or more unlabeled items of non-textual digital media content to one or more items of corresponding textual content.

In a further embodiment, generating the first tuned textual content generation model is based at least in part on the first distance being greater than the second distance. The computer-implemented method further includes, after generating the first tuned textual content generation model, generating a second tuned textual content generation model at least in part by tuning another particular tuned textual content generation model based at least in part on the first tuned textual content generation model. Generating the second tuned textual content generation model uses the one or more second items including second corresponding textual content of the one or more second items. The particular tuned textual content generation model is based at least in part on the first tuned textual content generation model by being based at least in part on the second tuned textual content generation model that is based at least in part on the first tuned textual content generation model.

In the same or a different further embodiment, generating the first tuned textual content generation model is based at least in part on the first distance being lesser than the second distance. The particular tuned textual content generation model is not based at least in part on the one or more second items.

In the same or a different further embodiment, the one or more background characteristics are a content purpose, a manner of content delivery, a source of content, a location where the content is stored or originated, a gender of a speaker of the content, a dialect of a speaker of the content, an age of a speaker of the content, and/or any other characteristic that describes origination of the content.

In the same or a different further embodiment, the first distance and the second distance are a cosine distance, a Euclidean distance, a Pearson correlation coefficient, a Manhattan distance, a Minkowski distance, a hamming distance, a Chebyshev distance, a Jaccard distance, a Haversine distance, a Sorensen-Dice distance, and/or any distance or similarity measurement between vectors, and/or any function thereof.

In the same or a different further embodiment, the one or more particular items of non-textual digital media content are in a target domain and are no more than 15, 20, 25, 30, 35, 40, 45, 50, 55, 60, 65, 70, 75, 80, 85, 90, 95, 100, 105, 110, 115, 120, 180, 240, 300, 400, 500, 600, 700, 800, 900, or 1000 seconds long and no more than 1, 2, 3, 4, 5, 6, 7, 8, 9, or 10, 15, 20, 25, 30, 35, 40, 45, or 50 in number.

In the same or a different further embodiment, the plurality of items of non-textual digital media content are audio files, video files, image files, images of handwriting, and/or audiovisual files.

In the same or a different further embodiment, the one or more pre-trained machine learning models comprise a multi-layer artificial neural network. Using the one or more pre-trained machine learning models to generate vector embeddings of the set of training data and using the one or more pre-trained machine learning models to generate the particular vector embedding comprise extracting vector embeddings from a hidden layer of the multi-layer artificial neural network. The multi-layer artificial neural network is a feed forward artificial neural network, and wherein the hidden layer is a last hidden layer of the feed forward artificial neural network. In a particular embodiment, the multi-layer artificial neural network is a feed forward artificial neural network, and the hidden layer is a last hidden layer of the feed forward artificial neural network.

In the same or a different further embodiment, using the one or more pre-trained machine learning models to generate vector embeddings of the set of training data comprises representing parts of an individual item of the one or more first items with first separate vector embeddings, and aggregating the first separate vector embeddings, and representing parts of an individual item of the one or more second items with second separate vector embeddings, and aggregating the second separate vector embeddings; and wherein using the one or more pre-trained machine learning models to generate the particular vector embedding comprises representing parts of an individual item of the one or more particular items with particular separate vector embeddings, and aggregating the particular separate vector embeddings In the same or a different further embodiment, aggregating the first separate vector embeddings includes determining a mean, median, mode, minimum, or maximum value from the first separate vector embeddings. Aggregating the second separate vector embeddings includes determining a mean, median, mode, minimum, or maximum value from the second separate vector embeddings. Aggregating the particular separate vector embeddings includes determining a mean, median, mode, minimum, or maximum value from the particular separate vector embeddings. In the same or a different further embodiment, the first distance and the second distance are determined based at least in part on a vector similarity search library.

In one embodiment, a computer-implemented method for tuning a pre-existing textual content generation model includes receiving out-of-domain data and in-domain seed data that comprise items of non-textual digital media content. The computer-implemented method further includes applying one or more pre-trained machine learning models to (i) data from the out-of-domain data to extract out-of-domain embeddings, and (ii) data from the in-domain seed data to extract in-domain embeddings. The computer-implemented method further includes grouping, into a plurality of groups, at least some out-of-domain embeddings of the out-of-domain embeddings based at least in part on distances between the at least some out-of-domain embeddings and the in-domain embeddings. The computer-implemented method further includes tuning the pre-existing textual content generation model using out-of-domain data associated with each group of the plurality of groups starting with those groups having out-of-domain embeddings that are further from the in-domain embeddings before progressively fine-tuning the model on out-of-domain data associated with other groups of the plurality of groups having out-of-domain embeddings that are closer to the in-domain embeddings.

In a further embodiment, the computer-implemented method further includes sampling out-of-domain embeddings, based on distance from the in-domain embeddings, up to a stopping criterion to define a tuning dataset. Said sampling treats in-domain embeddings as a query and matches the in-domain embeddings to a most similar out-of-domain embedding using a distance function. The distance function may be one of a cosine distance, a Euclidean distance, a Pearson correlation coefficient, a Manhattan distance, a Minkowski distance, a hamming distance, a Chebyshev distance, a Jaccard distance, a Haversine distance, a Sorensen-Dice distance, or any combination or function thereof.

In the same or a different further embodiment, the extracted out-of-domain embeddings overlap with the in-domain embeddings on one or more characteristics.

In the same or a different further embodiment, the out-of-domain data and the in-domain seed data comprises one or more of audio files, video files, image files, images of handwriting, or audiovisual files.

In the same or a different further embodiment, the in-domain seed data is audio data representing one minute of audio recordings plus or minus up to 30 seconds, and wherein the out-of-domain data is audio data representing greater than six thousand hours of audio data plus or minus up to 3000 hours.

In the same or a different further embodiment, the computer-implemented method further includes using the fine-tuned textual generation model to transform one or more unlabeled items of non-textual digital media content to one or more items of corresponding textual content.

In the same or a different further embodiment, the out-of-domain data comprises items of non-textual digital media content labeled with corresponding textual content and one or more background characteristics that indicate an origination category of a plurality of candidate origination categories of the item of non-textual digital media content. Said applying one or more pre-trained machine learning models further comprises using the background characteristics of the out-of-domain data to train another machine learning model for generating, from initial out-of-domain embeddings, a prediction of the one or more background characteristics. The applying further comprises extracting domain-calibrated embeddings as said out-of-domain embeddings from a hidden layer of the other machine learning model.

In a further embodiment, the background characteristics indicate an origination category of a plurality of candidate origination categories of the item of non-textual digital media content.

In a further embodiment, the one or more background characteristics include a content purpose, a manner of content delivery, a source of content, a location where the content is stored or originated, a gender of a speaker of the content, a dialect of a speaker of the content, or an age of a speaker of the content.

In various embodiments, a system includes one or more data processors accessing one or more non-transitory computer-readable storage media storing instructions which, when executed by the one or more data processors, cause the one or more data processors to perform part or all of one or more methods disclosed herein.

In various embodiments, a computer-program product stores instructions embodied in a non-transitory machine-readable storage medium configured to cause one or more data processors to perform part or all of one or more methods disclosed herein.

The described techniques may be implemented as methods performed by a machine, as machine(s) or system(s) including memory, one or more processors, and one or more non-transitory computer-readable media storing instructions, which, when executed, cause performance of steps of the methods, and/or as one or more non-transitory computer-readable media storing processor-executable instructions which, when executed, cause one or more processors to perform steps of the methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1A:
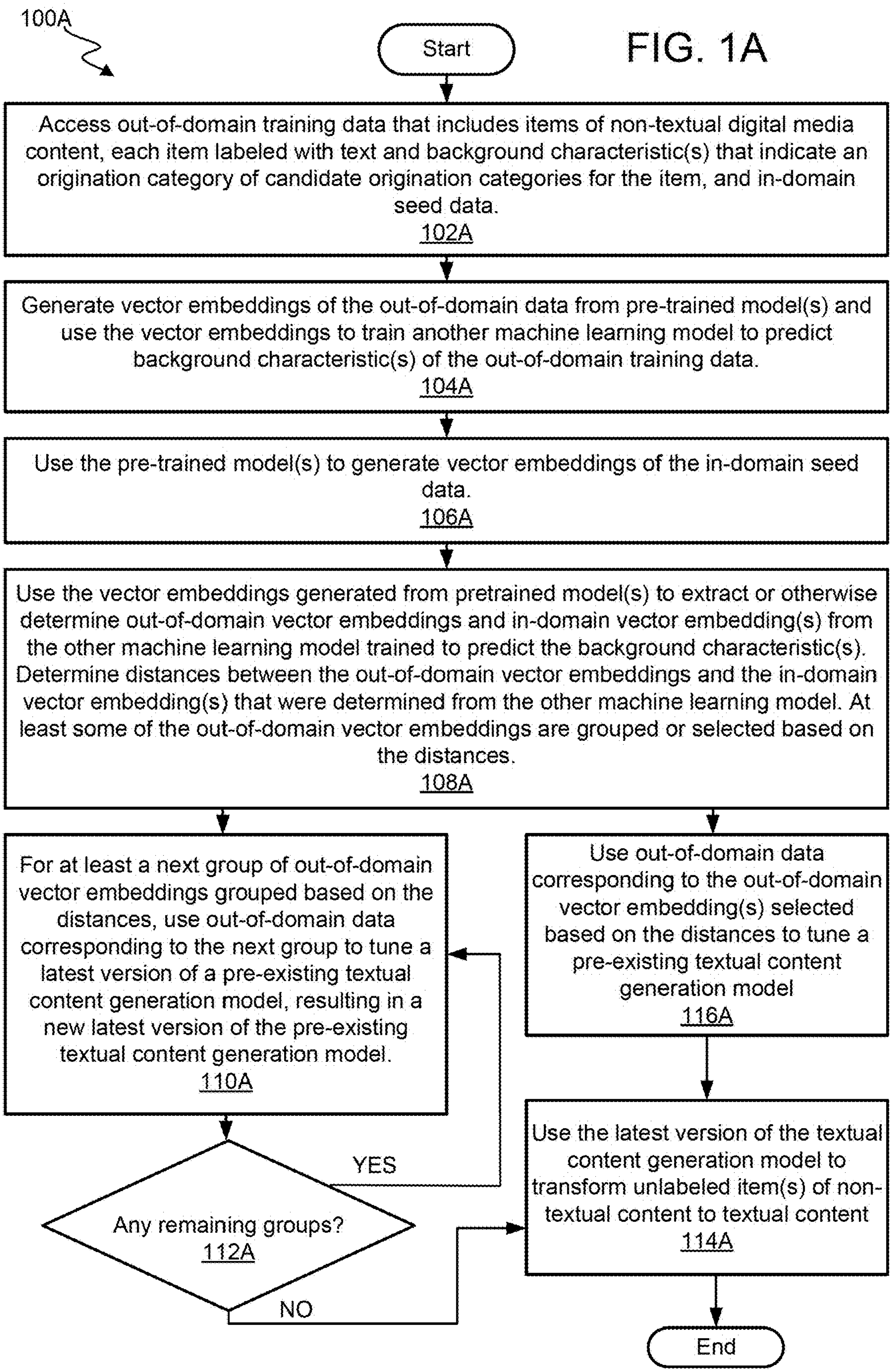
FIG. 1A illustrates a flow chart of an example process that fine-tunes a text generation model using out-of-domain data based on limited domain-specific clues determined from similarities between out-of-domain data and in-domain data on background characteristic(s).

A description of fine-tuning a text generation model using out-of-domain data based on limited domain-specific clues determined from similarities between out-of-domain data and in-domain data on background characteristic(s) is provided in the following sections:

- UNSUPERVISED MULTIMODAL DATA SELECTION FOR ASR FINE TUNING
- UNSUPERVISED DOMAIN-AWARE CURRICULUM FOR ASR FINE TUNING
- TRANSFORMING DIFFERENT FORMS OF NON-TEXTUAL DIGITAL MEDIA CONTENT INTO TEXT
- TRANSFORMING NON-TEXTUAL DIGITAL MEDIA CONTENT INTO TEXT FOR QUERY PROCESSING
- TRANSFORMING NON-TEXTUAL DIGITAL MEDIA CONTENT INTO TEXT FOR ROBOTIC CONTROL SYSTEMS
- SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Unsupervised Multimodal Data Selection for Asr Fine Tuning

Fine-tuning can be used to adapt an Automatic Speech Recognition (ASR) system to a new domain, based on some transcribed data from the target-domain. However, in real-world settings, the availability and the amount of target-domain data to support this fine-tuning can be limited, because of budget constraint or other reasons like privacy. In such cases, a possible approach is to automatically select candidate training data from a pre-existing pool of audio data (e.g. a mix of open-source datasets), based on a sample of the target domain.

In one embodiment, a data transformation system uses unsupervised data selection techniques for fine-tuning, under a limited budget of only one hour of training data, using a multi-source and multi-domain pool of data (for example, 7 datasets, 6 k hours, various genres and styles). The data transformation system may perform the following steps: extracting self-supervised model representations of multiple modalities (e.g., text, audio, and/or video), learning from these representations a domain-calibrated vector representation of what a domain is in terms of background characteristics that describe, indicate, or identify characteristic(s) of origination or an origination category of a plurality of candidate origination categories of the corresponding item of content. In other words, the model is trained to predict these background characteristics. Example background characteristics include a content purpose (e.g., genre, with example categories of audiobooks, meetings, or podcasts), a manner of content delivery (e.g., style, with example categories of spontaneous, oratory, or narrative speech), a source of content (e.g., origin, with example categories corresponding to different open-source repositories), a location where the content is stored or originated (with example categories corresponding to different regions of locations), a gender of a speaker of the content (with example categories of male or female), a dialect of a speaker of the content (a London accent, a northern accent, or a southern accent), an age of a speaker of the content, which may be expressed in ranges (6-10, 11-15, 16-20, 21-25, etc.) and/or any other characteristic that describes origination of the content. The background characteristics may alternatively or additionally be defined to include characteristics that indicate how the non-textual digital media content of the item originated, and/or as characteristics that otherwise affected the origination or creation or content inclusion of content in the non-textual digital media content item. The model trained to predict background characteristics may be used to generate vector representations for which k-nearest neighbor search may be used for automatic data selection.

FIG. 1A illustrates a flow chart of an example process 100A that fine-tunes a text generation model using out-of-domain data based on limited domain-specific clues determined from similarities between out-of-domain data and in-domain data on background characteristic(s). Process 100A starts in block 102A by accessing out-of-domain data that includes items of non-textual digital media content. Each item is labeled with text and background characteristic(s) that indicate an origination category of candidate origination categories for the item. Block 102A also includes accessing in-domain seed data. In block 104A, vector embeddings of the out-of-domain data are generated from pre-trained model(s) and used to train another machine learning model (e.g., a small neural network such as a multi-layer perceptron or, in a particular example, a 3-layer perceptron) to predict background characteristic(s), for example, based on vector embeddings of non-textual digital media content by comparing background characteristic predictions with actual background characteristics. In block 106A, the pre-trained model(s) are used to generate vector embeddings that represent item(s) of in-domain seed data, such as data that is labeled with text corresponding to non-textual content but is not labeled with any background characteristic(s) that indicate any origination categories. In block 108A, vector embeddings generated from pre-trained model(s) are used to extract or otherwise determine out-of-domain vector embeddings and in-domain vector embedding(s) from the other machine learning model trained to predict the background characteristic(s). For example, the vector embeddings from the pre-trained model(s) may be input into the other machine learning model, and corresponding vector embeddings may be extracted from a layer of the other machine learning model. The process of block 108A is different than just using a pre-trained model for producing vector embeddings. The use of the other machine learning model trained to predict the background characteristic such as genre, style, or dataset establishes a more meaningful distance between the in-domain and out-of-domain data (other than a distance between vector embeddings from a pre-trained model). Although the other machine learning model might not produce vector embeddings as a trained output, such vector embeddings may be extracted from the trained model otherwise used to predict background characteristics. For example, the vector embeddings may be extracted from a layer of the other machine learning model, such as a last hidden layer of a multi-layer neural network.

Distances are determined between the out-of-domain vector embeddings and the in-domain vector embedding(s) that were determined from the other machine learning model. At least some of the out-of-domain vector embeddings used in the distance determinations are selected or grouped based on the distances. For example, the out-of-domain vector embeddings used in the distance determinations may be grouped into groups of progressive distances away from the in-domain vector embeddings. As another example, the out-of-domain vector embeddings may be selected by weighting samples based on distance for weighted random selection based on distance without any grouping of the out-of-domain vector embeddings.

In one path of process 100A, proceeding to block 116A, out-of-domain data corresponding to the out-of-domain vector embedding(s) that were selected based on the distances are used to tune a pre-existing textual content generation model. For example, the pre-existing textual content generation model may include a Wave2Vec or Wave2Vec 2.0 model such as one described in Baevski, A., Zhou, H., Abdelrahman, M., Auli, M. (October 2020), "wav2vec 2.0: A Framework for Self-Supervised Learning of Speech Representations," the contents of which is incorporated by reference herein in its entirety. Examples of the Wave2Vec 2.0 model include (a) Facebook's Wave2Vec2 model, wave2vec2-large-960h-lv60, which is pretrained and fine-tuned on 960 hours of audio, and/or (b) Facebook's Wave2Vec2 model wav2vec2-large-lv60. Note that for model (b), to generate textual content the embeddings are decoded from the encoder-only models that provide vector embeddings rather than direct textual content. As another example, the pre-existing textual content generation model may include a HuBERT model such as one described in Hsu, W., Bolte, B., Tsai, Y., Lakhotia, K., Salakhutdinov, R., Mohamed, A. (June 2021), "HuBERT: Self-Supervised Speech Representation Learning by Masked Prediction of Hidden Units," the contents of which is incorporated by reference herein in its entirety. An example of the HuBERT model includes Facebook's Hubert model, Hubert-large-ls-960-ft, which is fine-tuned on 960 hours of audio. As yet another example, the pre-existing textual content generation model may include a multilingual HuBERT model such as one described in Boito, M., Iyer, V., Lagos, N., Besacier, L., and Calapodescu, I (June 2024), "mHuBERT-147: A Compact Multilingual HuBERT Model," the contents of which is incorporated by reference herein in its entirety. Note that for the mHuBERT-147 model, to generate textual content the embeddings are decoded from the encoder-only models that provide vector embeddings rather than direct textual content.

In this path of process 100A, other groups not selected, such as further-distance groups, may be discarded and not used for model tuning. The out-of-domain data corresponding to the selected vector embedding(s) may be applied to the latest version of the textual content generation model as a combined set of fine-tuning data, or may be provided to the latest version of the textual content generation model group-by-group, optionally starting with the furthest group.

In another path of process 100A, for at least a next group of out-of-domain vector embeddings that were grouped based on the distances, out-of-domain data corresponding to the next group is used to tune a latest version of a pre-existing textual content generation model, resulting in a new latest version of the pre-existing textual content generation model. A determination is made in block 112A on whether there are any remaining groups for use in tuning the latest version of the pre-existing textual content generation model. If so, process 100A proceeds back to block 110A with out-of-domain data corresponding to the next group being used to tune a version of the pre-existing textual content generation model that resulted from a prior iteration of block 110A, resulting in a new latest version of the pre-existing textual content generation model that may be used for other iterations of block 110A.

Once tuning in block 110A or 116A is completed, and, for block 110A, once block 112A determines there are no remaining groups to use for tuning, the latest version of the textual content generation model, or any textual content generation model based on the latest version such as another downstream version that has been further tuned or modified according to another process, may be used to transform unlabeled item(s) of non-textual content to textual content in block 114A.

Figure 1B:
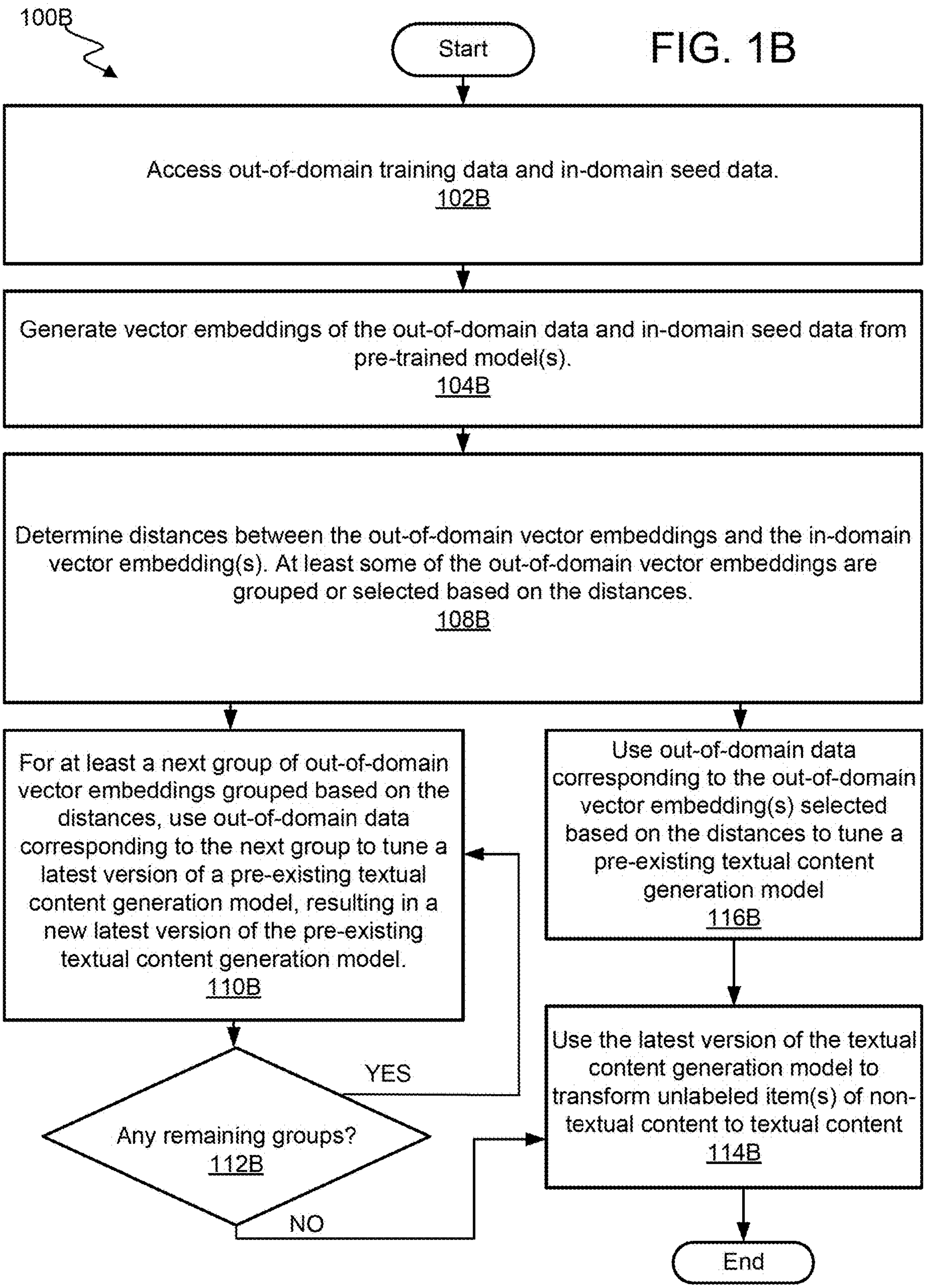
FIG. 1B illustrates a flow chart of an example process that fine-tunes a text generation model using out-of-domain data based on limited domain-specific clues determined from similarities between out-of-domain data and in-domain data.

FIG. 1B illustrates a flow chart of an example process that fine-tunes a text generation model using out-of-domain data based on limited domain-specific clues determined from similarities between out-of-domain data and in-domain data. Process 100B starts in block 102B by accessing out-of-domain data and in-domain seed data. In block 104B, vector embeddings of the out-of-domain data and in-domain seed data are generated from pre-trained model(s). In block 108B, a distance is determined between the out-of-domain vector embeddings and the in-domain vector embedding(s). At least some of the out-of-domain vector embeddings used in the distance determinations are selected or grouped based on the distances. For example, the out-of-domain vector embeddings used in the distance determinations may be grouped into groups of progressive distances away from the in-domain vector embeddings. As another example, the out-of-domain vector embeddings may be selected by weighting samples based on distance for weighted random selection based on distance without any grouping of the out-of-domain vector embeddings.

In one path of process 100B, proceeding to block 116B, out-of-domain data corresponding to the out-of-domain vector embedding(s) that were selected based on the distances are used to tune a pre-existing textual content generation model. In this embodiment, other groups not selected, such as further-distance groups, may be discarded and not used for model tuning. The out-of-domain data corresponding to the selected vector embedding(s) may be applied to the latest version of the textual content generation model as a combined set of fine-tuning data, or may be provided to the latest version of the textual content generation model group-by-group, optionally starting with the furthest group.

In another path of process 100B, for at least a next group of out-of-domain vector embeddings that were grouped based on the distances, out-of-domain data corresponding to the next group is used to tune a latest version of a pre-existing textual content generation model, resulting in a new latest version of the pre-existing textual content generation model. A determination is made in block 112B on whether there are any remaining groups for use in tuning the latest version of the pre-existing textual content generation model. If so, process 100B proceeds back to block 110B with out-of-domain data corresponding to the next group being used to tune a version of the pre-existing textual content generation model that resulted from a prior iteration of block 110B, resulting in a new latest version of the pre-existing textual content generation model that may be used for other iterations of block 110B.

Figure 2:
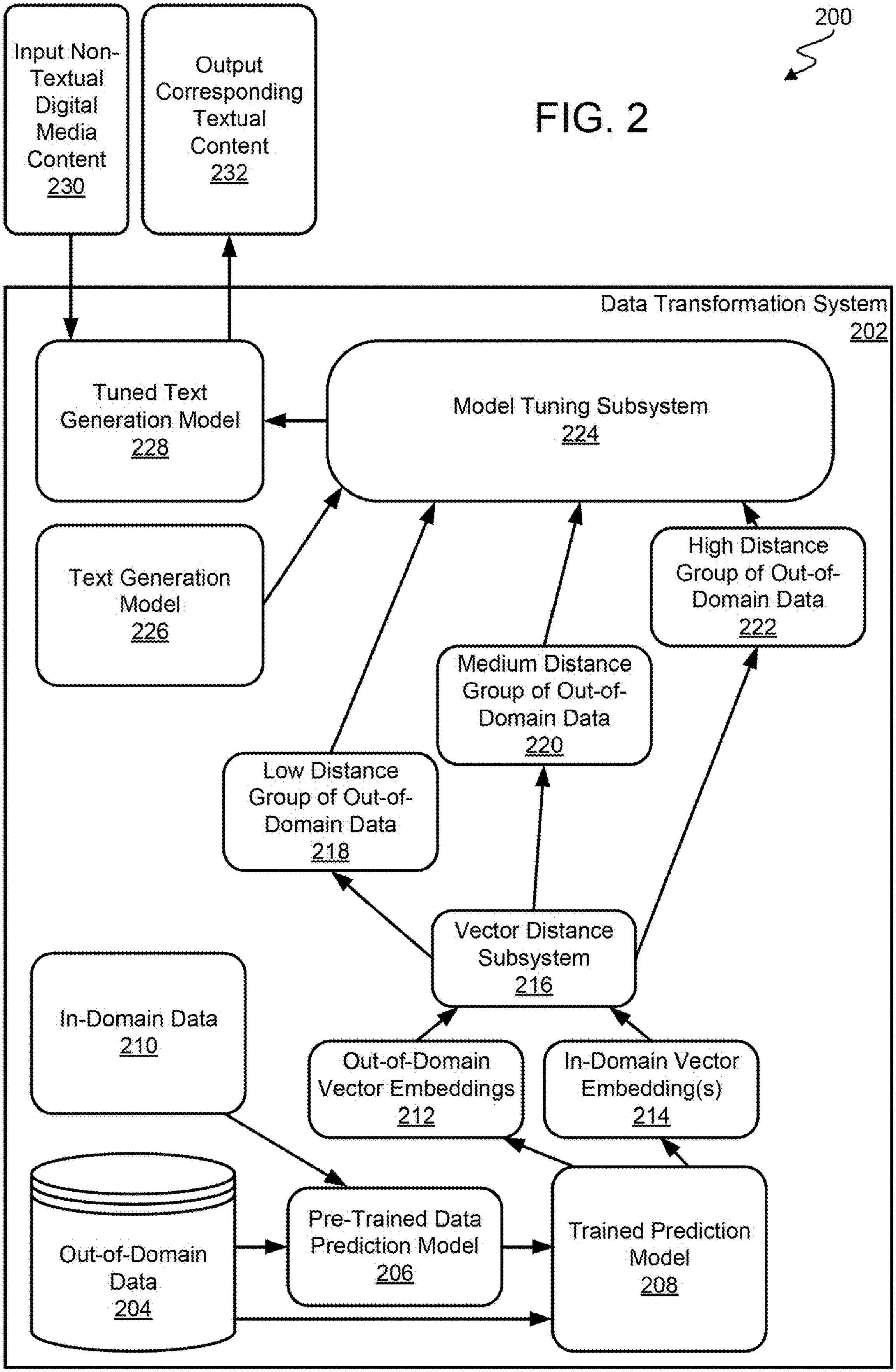
FIG. 2 illustrates a system diagram showing an example system that fine-tunes a text generation model using out-of-domain data based on limited domain-specific clues determined from similarities between out-of-domain data and in-domain data on background characteristic(s).

FIG. 2 illustrates a system diagram showing an example system 200 that fine-tunes a text generation model using out-of-domain data based on limited domain-specific clues determined from similarities between out-of-domain data and in-domain data on background characteristic(s). As shown, system 200 includes data transformation system 202, which uses at least some out-of-domain data 204 to train a machine learning model, such as to predict background characteristic(s) based on vector embeddings generated using a pre-trained data prediction model 206, resulting in trained prediction model 208. Any amount of in-domain data 210 that is available may be input to pre-trained data prediction model 206 to generate vector embeddings that are input to trained prediction model 208 to generate in-domain vector embedding(s) 214. Vector embeddings generated from pre-trained data prediction model 206 based on out-of-domain data 204 may be input into trained prediction model 208 to generate out-of-domain vector embeddings 212. Vector distance subsystem 216 compares out-of-domain vector embeddings 212 to in-domain vector embedding(s) 214 to determine a low distance group of out-of-domain data 218, a medium distance group of out-of-domain data 220, and a high distance group of out-of-domain data 222. Model tuning subsystem 224 uses a selected one or more of clusters 218, 220, and 222 to tune a text generation model, resulting in tuned text generation model 228. In one example, model tuning subsystem 224 uses low distance cluster of out-of-domain data 218 without using clusters 220 or 222 for tuning purposes. Data transformation system 202 or another system may receive input 230 containing non-textual digital media content and use tuned text generation model 228 to generate output 232 containing or based on corresponding textual content 232.

The data transformation system, when applied to ASR, may result in an improvement of the Word Error Rate. For example, initial experiments showed such an improvement of up to about 13% (3.2 WER points) on average in one set of examples, compared to baselines.

The data transformation system may accomplish these improvements using data selection to perform speech recognition based on fine-tuned models that handle multi-modal content so training data from one domain may be adapted for use to improve a data transformation model in another domain.

Using the data transformation system in various experiments and examples, self-supervised learning (SSL) based pre-trained speech models like HuBERT and wav2vec 2.0 may achieve positive results in terms of word error rate (WER) when fine-tuned on as little as an hour or two of transcribed data. As a consequence, especially in low-resource settings, fine-tuning helps develop more accurate automatic speech recognition (ASR) models. However, in a real-world setting, the availability of an appropriate amount of target-domain data can be problematic either because of budget constraints or privacy reasons. In that case, a possible approach is to bootstrap the ASR creation process by using a pre-existing, e.g. open-source, large pool of transcribed audio data and select from the pool subsets that are expected to be the most representative of the target domain, based on a very small sample of target-domain transcribed data, such as a seed of only 15, 20, 25, 30, 35, 40, 45, 50, 55, 60, 65, 70, 75, 80, 85, 90, 95, 100, 105, 110, 115, 120, 180, 240, 300, 400, 500, 600, 700, 800, 900, or 1000 seconds. Examples provided herein may refer to a one-minute seed, but such examples may be adapted to use any of these seed times as ranges between any of these values, as lower-capped values, as upper-capped values, and/or as exact seed lengths.

The data transformation system may use unsupervised data selection techniques for fine-tuning the wav2vec 2.0 model, under a limited budget, using a multi-source and multi-domain pool of transcribed audio data. The data transformation tool may use k-nearest neighbor (KNN) search and/or distributional assumptions to match or cluster content. These techniques are improved with better vector embeddings of the content. The data transformation system uses SSL-based multimodal domain-calibrated embeddings for ASR fine-tuning, and combines these embeddings with KNN search to perform data selection for model training or tuning.

In an example, the data transformation system uses a data pool with datasets from the End-to-End Speech Benchmark (ESB) to evaluate the performance of an ASR system across a broad set of speech domains. In this example, the data transformation system improves the WER compared to random selection by up to 13% (3.2 WER points) on average.

In some examples, data selection techniques with self-trained models may be used in pre-training and/or fine-tuning stages. At the fine-tuning stage, data selection techniques may involve single and/or multidomain selection. For instance, in the single-domain case, perplexity-based methods may be used to optimally select fine-tuning data that shares the same domain as the pre-trained model. In the multi-domain case, selection may be based on scores or votes from existing ASR models, via uncertainty sampling, query by committee, and/or combination of those with submodular functions. Pre-trained models may also be used in this context.

In some examples, the use of contrastive loss ratios between two models may be trained on general and target data. In another example, the discrete representations of the pre-trained models may be used to develop generic and target-domain language models, and then propose a contrastive perplexity-based metric to rank the utterances according to their utility for fine-tuning. However, both examples involve using a considerable quantity of unlabeled audio data from the target domain. If such data is not available, a smaller sample (e.g. 1 minute) of transcribed audio from the target domain may be used by the data transformation system according to various techniques described herein. Such techniques may provide positive results even if the target-domain data does not exist in the larger pool of labeled data.

Figure 6:
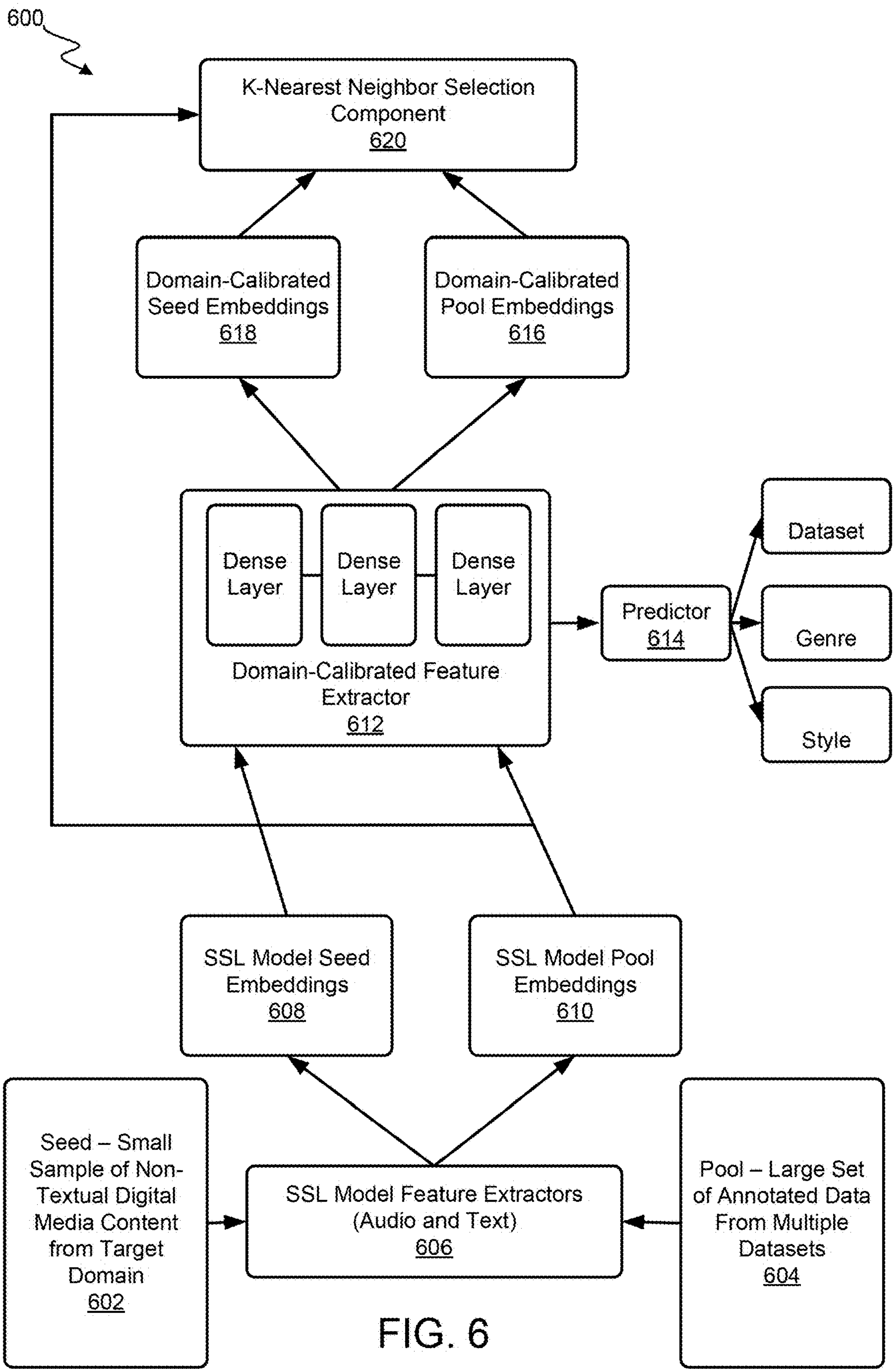
FIG. 6 shows a diagram of an example process for data transformation.

FIG. 6 shows a diagram of an example process 600 for data transformation. A seed 602, such as a small sample (e.g., one minute) from the target domain may be available for processing and comparison with a pool 604. The pool 604 may include a large set (e.g., 500 hours, 1000 hours, 5000 hours, 6000 hours or more) of annotated data from multiple datasets (e.g. 2-6 datasets or more). The seed and pool are used by SSL model feature extractors 606 to generate SSL model seed embeddings 608 and SSL model pool embeddings 610. SSL model seed embeddings and SSL model pool embeddings are used by domain-calibrated feature extractor 612 that is trained to predict background characteristics available from annotations on the pool 604 such as dataset, genre, and style for the SSL model pool embeddings. Domain-calibrated feature extractor 612 is similarly available to predict background characteristics for other embeddings such as those from SSL model seed embeddings 608. Domain-calibrated seed embeddings 618 and domain-calibrated pool embeddings 616 are extracted by domain-calibrated feature extractor 612 from a layer of a multi-layer artificial neural network having many dense layers. In a first embodiment shown in FIG. 1A, the domain-calibrated seed embeddings 618 and domain-calibrated pool embeddings 616 are fed to a k-nearest selection component 620 after being calibrated by domain-calibrated feature extractor 612. In a second embodiment shown in FIG. 1B, SSL model seed embeddings 608 and SSL model pool embeddings 610 are fed to k-nearest neighbor selection component 620 without being calibrated by domain-calibrated feature extractor 612. In both embodiments at 110/112 or 116 and 114 in FIG. 1A and FIG. 1B, once embeddings are selected by the k-nearest neighbor selection component 602, they are used to tune a pre-existing textual content generation model (e.g., an automatic speech recognition model).

In one embodiment, a Multi-layer Perceptron (MLP) or any other multi-layer artificial neural network may serve as the domain-calibrated feature extractor 612. The MLP may be trained on the SSL embeddings in multi-task fashion. In one example, the MLP's outputs include dataset, style, and genre labels or any other labels that characterize an origin or other characteristic such that values of the characteristics are shared by a group of items but not other items in the dataset. The MLP's last hidden layer is used to extract the domain-calibrated embeddings, once the network is trained.

The data transformation system uses pre-trained models, such as all-MiniLM-L6-v2 and wav2vec 2.0, to extract text and audio SSL embeddings for our seed and data pool. Additional details regarding development and use of the all-MiniLM-L6-v2 pre-trained model and sentence-bert is provided in Nils Reimers and Iryna Gurevych, "Sentence-bert: Sentence embeddings using siamese bert-networks," in *Proceedings of the* 2019 *Conference on Empirical Methods in Natural Language Processing.* 11 2019, Association for Computational Linguistics, which is incorporated herein by reference in its entirety for all purposes. Additional details regarding development and use of the wav2vec2.0 pre-trained model is provided in Alexei Baevski, Henry Zhou, Abdelrahman Mohamed, and Michael Auli, "Wav2vec 2.0: A framework for self-supervised learning of speech representations," in *Proceedings of the* 34*th International Conference on Neural Information Processing Systems*, Red Hook, NY, USA, 2020, NIPS'20, Curran Associates Inc., which is incorporated herein by reference in its entirety for all purposes.

The data transformation system applies mean pooling at the utterance level on the SSL audio embeddings. Utterance level mean pooling is used to generate vector embeddings for variable length inputs by representing each piece, chunk, or other token of the input as a vector embedding. The vector embeddings of the tokens may be averaged token by token to result in a vector embedding for the audio embedding as a whole. The SSL embeddings are combined with a KNN search component, so that the most similar items between the seed and the pool get selected. The data transformation system treats the seed as a query and matches the seed to the most similar items in the pool using a distance function (for example, Cosine Distance, Euclidean Distance, Pearson Correlation Coefficient, Manhattan Distance, Minkowski Distance, Hamming Distance, Chebyshev Distance, Jaccard Distance, and/or Sørensen-Dice Distance, or any one or a combination thereof). For example, the distance functions may determine distances based on a comparison of numerical vector coordinates between one vector embedding and corresponding vector coordinates of another vector embedding.

A Cosine Distance or cosine similarity may be determined between two vectors based on a cosine of the angle between the two vectors. A cosine similarity between two identical vectors is 1, and a cosine similarity between two opposite vectors is −1. A cosine similarity between two unrelated or orthogonal vectors is 0.

A Euclidean Distance may be determined between two vectors based on a square root of a sum of the squares of the distances between components of the two vectors. A high Euclidean distance implies that one or many pairs of components are distant from each other between the two vectors.

A Pearson Correlation Coefficient may be determined between two vectors based on a ratio between the covariance between the vectors and the product of the standard deviations between the two vectors. A high correlation coefficient near 1 means the two vectors are similar or identical, and a low correlation coefficient near −1 means the two vectors are opposite. A correlation coefficient near 0 means the vectors are mostly orthogonal or unrelated.

A Manhattan Distance may be determined between two vectors based on a sum of the absolute differences between components of the vectors. A high Manhattan distance implies that one or many pairs of components are distant from each other between the two vectors.

A Minkowski Distance may be determined between two vectors based on a sum of the absolute differences between components of the vectors raised to a power, p, for each component pair. The p-th root of the sums are the Minkowski Distance, which equals the Manhattan Distance when p=1 and the Euclidean Distance when p=2.

A Hamming Distance may be determined between two vectors based on how many positions at which corresponding components of the vectors are different or sufficiently different. For each component pair in the vectors that are different, a counter is incremented, and the Hamming Distance is the total counter for the vectors across all component pairs.

A Chebyshev Distance may be determined between two vectors based on the greatest of the absolute differences among the vectors' corresponding components. The maximum absolute difference among all pairs of components is the Chebyshev Distance.

A Jaccard Distance may be determined between two vectors based on a ratio between the size of the intersection between the vectors (based on elements in common between the vectors) to the size of the union between the vectors (based on elements in either or both of the vectors). Jaccard Similarity is defined by the ratio, and Jaccard Distance is defined as one minus the Jaccard Similarity.

A Soørensen-Dice Distance may be determined between two vectors based on the number of elements common to both vectors, the number of elements in one vector, and the number of elements in another vector. The Sørensen-Dice Similarity is determined as two times the number of elements in common among the vectors divided by the sum of the number of elements in each vector. The Sørensen-Dice Distance is one minus the Sørensen-Dice Similarity.

The KNN search component can be implemented by any vector similarity search library, such as Facebook AI Similarity Search (FAISS), Scalable Nearest Neighbor (ScaNN), and/or Hierarchical Navigable Small Worlds (HNSW). Additional details regarding implementing a search component using a vector similarity search library are provided in Jeff Johnson, Matthijs Douze, and Hervé Jégou, "Billion-scale similarity search with GPUs," *IEEE Transactions on Big Data*, vol. 7, no. 3, pp. 535-547, 2019, which is incorporated herein by reference in its entirety for all purposes.

To promote an alignment with the target domain's specific data characteristics, the SSL audio embeddings may be calibrated with an auxiliary network or classifier, such as a Multi-Layer Perceptron (MLP). Such calibration may occur, for example, before using the distance function to determine most similar items in the pool. In one embodiment, the MLP's input includes the SSL audio embeddings, while the output of the MLP includes high-level domain-specific labels such as the ids of the datasets in the pool, the style of each dataset (e.g. spontaneous, oratory or narrative speech), the genre (e.g. audiobooks, meetings, podcasts) of the dataset, or any other characteristic about the origin of the dataset, or any other characteristic that causes or is otherwise correlated with differences in content that can be learned. The MLP may be trained in a multi-task fashion with the outputs. Once the model is trained, domain-calibrated embeddings are extracted from the last hidden layer of the network. The domain-calibrated embeddings may then be combined with KNN search, as described above.

Given that transcriptions are available in both the pool and the seed, the data transformation system may also implement a multimodal variant of the domain-calibrated feature extractor, by concatenating audio and text SSL embeddings at the input of the MLP.

TABLE 1

Details of datasets from the English ESB benchmark used in various examples.

| Dataset | Genre | Style | Train/Val/Test |
|---|---|---|---|
| LibriSpeech | Adiobook | N | 960/11/11 |
| CommonVoice | Wikipedia | N | 1409/27/27 |
| TED-LIUM | TED talks | O | 454/2/3 |
| VoxPopuli | EU Parl. | O | 523/5/5 |
| AMI | Meetings | S | 105/5/5 |
| Earnings-22 | Meetings | O, S | 105/5/5 |

TABLE 1-continued

| Details of datasets from the English ESB benchmark used in various examples. | | | |
|---|---|---|---|
| Dataset | Genre | Style | Train/Val/Test |
| GigaSpeech | Audiobook, podcast, YouTube | N, S | 2500/12/40 |

N stands for Narrative, O for Oratory and S for Spontaneous speech.

A subset of the ESB benchmarks, which may or may not include Switchboard, CHiME-4, and/or SPGISpeech, may be used to validate the examples, as shown in Table 1. ESB is a benchmark for evaluating the performance of ASR systems across a broad set of speech domains and datasets. The transcriptions of the datasets are normalized. Additional detail about normalizing transcriptions of datasets is provided in Sanchit Gandhi, Patrick von Platen, and Alexander M. Rush, "ESB: A benchmark for multi-domain end-to-end speech recognition," *CoRR*, vol. abs/2210.13352, 2022, which is incorporated herein by reference in its entirety for all purposes. Each dataset represents a separate domain. Additional detail about datasets representing separate domains is provided in Alan Ramponi and Barbara Plank, "Neural unsupervised domain adaptation in nlp—a survey," ArXiv, vol. abs/2006.00632, 2020, which is incorporated herein by reference in its entirety for all purposes.

To create the seeds the data transformation system may extract randomly three 1-minute samples per dataset from the validation (Val) subset, which allows the data transformation system to compute standard deviation, which is an indicator of the sensitivity of the data transformation method to different seeds. The data transformation system may or may not control seeds for speaker diversity. The remaining data from each Val subset is used as development data during the corresponding ASR system's finetuning, to set up hyper-parameters. In some cases such as the in-domain experiments on Earnings-22, one of the seeds may contain noisy samples (i.e. wrong transcriptions or empty audio files), which may lead to selecting excessive amounts of noise from the pool. For instance, in the case of Earnings-22, on average 10 samples are included in a 1-minute seed. That means that one noisy file corresponds to about 10% of the seed. In these cases, the seed is not used in the experimental stage. Longer duration seeds (e.g. 5 minutes) may be used, for example, to further mitigate the impact of a noisy file on the result. Returning to the example, for each 1-minute seed, the data transformation system selects 1-hour of data from the pool to be used as the fine-tuning data. The selection is done as explained by determining a distance between vector embeddings that may, for example, result from a model trained to make predictions for a different domain than the target domain. For the KNN search component, the data transformation system may use FAISS with squared Euclidean distance. The data transformation system may limit the sample budget to 1-hour only, to validate testing of a setup where only audio embeddings are available, and where creating transcriptions may be very expensive.

To create the pool, the data transformation system may index the training subsets using FAISS. This corresponds to a total of 6029 hours of audio. For both the seed and the pool, the data transformation system extracts the embeddings for each item from the 9th layer of the wav2vec 2.0 Base model and applies mean pooling before indexing. Additional detail on extracting embeddings from a layer of a base model are provided in (1) Patrick Cormac English, John D. Kelleher, and Julie Carson-Berndsen, "Domain-informed probing of wav2vec 2.0 embeddings for phonetic features," in *Proceedings of the* 19*th* *SIGNMORPHON Workshop on Computational Research in Phonetics, Phonology, and Morphology*, Seattle, Washington, July 2022, pp. 83-91, Association for Computational Linguistics, and (2) Yaman Kumar Singla, Jui Shah, Changyou Chen, and Rajiv Ratn Shah, "What do audio transformers hear? Probing their representations for language delivery structure," in 2022 *IEEE International Conference on Data Mining Workshops* (*ICDMW*), 2022, pp. 910-925, each of which is incorporated herein by reference in its entirety for all purposes.

For the text, the data transformation system may use the all-MiniLM-L6-v2 model of sentence-bert.

TABLE 2

| Details of fine-tuning hyper-parameters per dataset. | | | | |
|---|---|---|---|---|
| Dataset | Learning rate | Warmup Iterations | Total Iterations | Batch |
| LibriSpeech | 1e−4 | 100 | 500 | 36 |
| CommonVoice | 2.5e−5 | 100 | 1000 | 24 |
| TED-LIUM | 5e−5 | 200 | 1000 | 24 |
| VoxPopuli | 5e−5 | 100 | 500 | 24 |
| AMI | 5e−5 | 200 | 1000 | 36 |
| Earnings-22 | 1e−4 | 200 | 1000 | 24 |
| GigaSpeech | 5e−5 | 200 | 1000 | 24 |

In one example, the data transformation system uses SpeechBrain to fine-tune the ASR models. Additional detail on using SpeechBrain for fine-tuning is provided in Mirco Ravanelli, Titouan Parcollet, Peter Plantinga, Aku Rouhe, Samuele, Cornell, Loren Lugosch, Cem Subakan, Nauman Dawalatabad, Abdelwahab Heba, Jianyuan Zhong, Ju-Chieh Chou, Sung-Lin Yeh, Szu-Wei Fu, Chien-Feng Liao, Elena Rastorgueva, Frangois Grondin, William Aris, Hwidong Na, Yan Gao, Renato De Mori, and Yoshua Bengio, "SpeechBrain: A general-purpose speech toolkit," 2021, arXiv: 2106.04624, which is incorporated herein by reference in its entirety for all purposes.

In a further example, the data transformation system may add a 3-layer dense module of size 1024 each with LeakyReLU activations on top of the wav2vec 2.0 large model (LS960h) and use a randomly initialized output layer to predict characters. After a warm-up period (c.f. Table 2), the data transformation system unfreezes the wav2vec 2.0 model, while keeping the feature extractor part frozen. The data transformation system may use the Adam optimiser for wav2vec 2.0 and Adadelta (lr: 0.9, rho: 0.95, eps: 1.e-8) for the dense module with a scheduler based on the new-bob technique for learning rate annealing (improvement threshold: 0.0025, annealing factor: 0.8, patient: 0). The example learning rates that are given to Adam and the number of iterations per dataset are listed in Table 2. The model is fine-tuned with a Connectionist Temporal Classification (CTC) loss. In one embodiment, no language model is used.

In one embodiment, the Multi-Layer Perceptron that corresponds to the domain-calibrated feature extractor has 3 dense layers with ReLU activation and dropout of 0.2. There is one output layer per task. Predicting the dataset id corresponds to a single label classification task, while the prediction of the style and genre are both multi-label classification tasks. For the dataset id, the data transformation system uses an output layer with softmax activation, and for the other two tasks the data transformation system uses sigmoid activations. The data transformation system may use Cross Entropy loss for the dataset id classification and Binary Cross Entropy (BCEWithLogits) for the other two tasks. In this embodiment, the total loss equals to the sum of all three losses.

In one example, the data transformation system may use 70%, 75%, 80%, 85%, 90%, or 95% of the pool as training data and the remaining 30%, 25%, 20%, 15%, 10%, or 5% for development. The data transformation system may train the MLP for 2 epochs. On the concatenation of the Val subsets, the data transformation system predicts the dataset id (the most difficult task) with an accuracy of 88.85% using the audio only, 66.6% with the text only, and 90.54% with both modalities.

If results are to be evaluated, the data management system may implement two evaluation steps: 1. In-domain (ID): Seeds are extracted from the Val subset of each dataset in turn. The pool includes data from the Train subsets of all datasets and thus includes data from the target domain. Example results are in Table 3. 2. Out-of-domain (OOD): Seeds are extracted from the Val subset of each dataset in turn. At each turn the dataset from which the seeds are extracted is considered as the target domain and the Train subset of that dataset is therefore removed from the pool. Note that in that case the MLP does not see data from the target-domain dataset either. Additional detail about protocols for multi-source domain adaptation for image classification are provided in Xingchao Peng, Qinxun Bai, Xide Xia, Zijun Huang, Kate Saenko, and Bo Wang, "Moment matching for multi-source domain adaptation," 2019 *IEEE/CVF International Conference on Computer Vision* (*ICCV*), pp. 1406-1415, 2018, which is incorporated herein by reference in its entirety for all purposes. Example results are in Table 4.

Domain calibrated models may be referred to with the Dom suffix. The Oracle model corresponds to a model trained on 1 hour of data randomly selected from the official training subset of each dataset. The data transformation system uses random selection as a good technique that promotes topic, vocabulary and speaker diversity as long as the data selection pool is inherently diverse'.

The data transformation system has almost no access to data from the target domain, except for the 1-minute seed. Accordingly, none of the existing methods for learning from the target domain are directly applicable. The data transformation may instead use random data selection from the pool as a baseline to measure performance of intelligent selection from the pool using techniques described herein.

TABLE 3

Example in-domain results. Standard deviation is computed on three data seeds.

| Dataset | Oracle | Random | Text | Audio | Text_Dom | Audio_Dom | Multimodal_Dom |
|---|---|---|---|---|---|---|---|
| LibriSpeech-clean | 3.61 | 4.71 ± 0.28 | 5.05 ± 0.25 | 3.81 ± 0.21 | 4.51 ± 0.29 | 3.65 ± 0.10 | 3.99 ± 0.16 |
| LibriSpeech-other | 8.24 | 10.15 ± 0.35 | 10.68 ± 0.57 | 8.91 ± 0.19 | 9.99 ± 0.42 | 8.54 ± 0.18 | 9.39 ± 0.13 |
| CommonVoice | 30.82 | 31.92 ± 0.13 | 31.29 ± 0.20 | 30.69 ± 0.12 | 31.14 ± 0.23 | 30.60 ± 0.43 | 30.09 ± 0.12 |
| Tedlium | 11.23 | 12.12 ± 0.40 | 11.94 ± 0.12 | 12.79 ± 0.44 | 11.96 ± 0.43 | 11.90 ± 0.21 | 12.51 ± 0.28 |
| Voxpopuli | 17.76 | 20.18 ± 0.30 | 19.26 ± 0.13 | 19.16 ± 0.06 | 18.60 ± 0.41 | 17.57 ± 0.40 | 17.77 ± 0.34 |
| AMI | 29.79 | 41.35 ± 0.44 | 33.59 ± 0.76 | 33.85 ± 0.16 | 32.72 ± 0.24 | 31.24 ± 0.24 | 30.45 ± 1.12 |
| Earnings22 | 29.84 | 41.26 ± 0.56 | 35.36 ± 2.81 | 35.31 ± 2.64 | 33.98 ± 3.06 | 33.69 ± 1.66 | 32.01 ± 3.47 |
| Gigaspeech | 25.38 | 25.86 ± 0.63 | 25.33 ± 0.92 | 26.07 ± 0.15 | 25.14 ± 0.31 | 25.5 ± 0.11 | 25.83 ± 0.50 |
| Averages | 19.58 | 23.44 ± 0.38 | 21.56 ± 0.72 | 21.32 ± 0.50 | 21.00 ± 0.67 | 20.33 ± 0.42 | 20.25 ± 0.77 |

TABLE 4

Example out-of-domain results. Standard deviation is computed on three data seeds.

| Dataset | Random | Text | Audio | Text_Dom | Audio_Dom | Multimodal_Dom |
|---|---|---|---|---|---|---|
| LibriSpeech-clean | 5.27 ± 0.11 | 5.32 ± 0.34 | 4.08 ± 0.11 | 4.90 ± 0.20 | 4.12 ± 0.05 | 4.09 ± 0.12 |
| LibriSpeech-other | 11.24 ± 0.08 | 11.29 ± 0.10 | 9.12 ± 0.36 | 10.68 ± 0.46 | 9.33 ± 0.08 | 9.42 ± 0.19 |
| CommonVoice | 35.55 ± 0.21 | 36.11 ± 1.00 | 35.99 ± 0.49 | 36.29 ± 1.07 | 35.73 ± 0.11 | 35.96 ± 0.48 |
| Tedlium | 12.15 ± 0.05 | 12.36 ± 0.16 | 13.39 ± 0.45 | 12.35 ± 0.15 | 11.98 ± 0.42 | 11.41 ± 0.45 |
| Voxpopuli | 21.73 ± 0.63 | 21.15 ± 0.36 | 20.38 ± 0.16 | 20.84 ± 0.40 | 20.34 ± 0.40 | 20.08 ± 0.37 |
| AMI | 41.41 ± 0.12 | 38.78 ± 0.49 | 38.52 ± 0.71 | 38.37 ± 0.76 | 39.51 ± 0.13 | 37.26 ± 0.07 |
| Earnings22 | 40.38 ± 0.76 | 40.72 ± 0.30 | 39.43 ± 0.49 | 39.25 ± 1.25 | 39.33 ± 1.02 | 38.27 ± 1.58 |
| Gigaspeech | 26.05 ± 0.47 | 25.97 ± 0.41 | 26.54 ± 0.35 | 25.80 ± 0.36 | 25.51 ± 0.10 | 25.34 ± 0.11 |
| Averages | 23.44 ± 0.38 | 21.56 ± 0.72 | 21.32 ± 0.50 | 21.00 ± 0.67 | 20.33 ± 0.42 | 20.25 ± 0.77 |

In the out-of-domain example, the data transformation system achieved an improvement of 1.5 WER points compared to the random selection baseline, which corresponds to Word Error Rate Reduction (WERR) of 6.200. The improvement in the ID setup is 3.2 WER points or WERR of 13.400 for the multimodal domain calibrated model. In the example, the ID domain-calibrated audio-only model is only 0.85 WER points worse than the oracle (<4 WERR), having significant differences in the spontaneous speech datasets (Earnings-22 and AMI).

When the domain has been calibrated in various examples, the data transformation system observed improvements on datasets in both text and audio modalities in the ID case. The average improvement for the audio modality reaches 1 WER point or WERR of 4.60%. In the example, there was similar behavior in the OOD case for the text. In the example, when the audio was used, the results varied. For instance, in this particular example, the performance improved in the case of TEDLIUM and GigaSpeech but deteriorated in the case of AMI. Also in this particular example, when TEDLIUM is the target domain, the data transformation system selected 51% of the samples from GigaSpeech before calibration, while this increases to 92% after calibration. This significant increase in combination with the fact that the results on TEDLIUM are on par with the Oracle in the ID and OOD setups, indicate that GigaSpeech may act, in a sense, as a replacement dataset for TEDLIUM. GigaSpeech includes a number of podcasts extracted from YouTube on similar topics to TEDLIUM, such as science and technology.

In various examples, multimodal input helped in the out-of-domain setting, and with spontaneous speech (i.e. AMI, Earnings-22) in the ID setting. In a particular example, audio is performant on LibriSpeech, the same dataset on which the feature extractor wav2vec 2.0 has been pre-trained. Data selection based on pre-training artifacts (in their case pre-training loss) can inherit biases from the pre-training stage.

In a particular example, the ID WER of Earnings-22 had high standard deviation (up to 3.4 points), ranging from 29.5 (on par with the oracle) to 35.2. This standard deviation may be mitigated by seeds having minimal or mitigated noise. In many examples, standard deviation was comparatively low, illustrating that random seed selection is a viable approach.

In various examples, the data transformation system used a pre-existing, e.g. open-source, pool of audio data, as a replacement to target-domain data in low-resource settings. Based on only 1-minute transcribed audio seed from the target domain, the data transformation system shows that a method combining k-nearest neighbor search with multi-modal domain-calibrated embeddings can improve the WER by up to 13% in an in-domain setting and 6% in an out-of-domain configuration, compared to random selection. Other examples include longer duration seeds and higher transcription budgets.

Unsupervised Domain-Aware Curriculum for ASR Fine Tuning

In real-world settings, the availability of target-domain data needed for fine-tuning Automatic Speech Recognition systems can be limited. In such low-resource settings, one way of improving the performance of models is training on out-of-domain data that bears similarity to the target domain. Once such data is selected, it is traditionally provided to the model in an ad-hoc, random manner during training, which might yield sub-optimal results.

In one embodiment, a data transformation system replaces ad-hoc-curriculum for ASR fine-tuning and instead uses an Unsupervised Domain-Aware Curriculum (U-DAC) method. The U-DAC method includes grouping examples according to their distances from the target domain and training the model on each group sequentially from the most-to-least distant, keeping each time the best checkpoint only for further training.

Referring back to FIG. 1, after distances between the out-of-domain vector embeddings and the in-domain vector embedding(s) have been determined in block 108, process 100 may proceed along path 110A or 1101B. In block 110A, the furthest remaining cluster of out-of-domain data is used to tune a latest version of a textual content generation model, resulting in a new latest version of the textual content generation model. In block 112, a determination is made as to whether there are any remaining cluster of out-of-domain data to use for tuning. If so, process 100 proceeds in another iteration to block 110A, where the furthest remaining cluster (a different cluster from the previous iteration) of out-of-domain data is used to tune a latest version of a textual content generation model (the new latest version from the previous iteration), resulting in a new latest version of the textual content generation model. If there are no remaining clusters, as determined in block 112, the latest version of the textual content generation model, or any textual content generation model based on the latest version such as another downstream version that has been further tuned or modified according to another process, may be used to transform unlabeled item(s) of non-textual content to textual content in block 114.

Referring back to FIG. 2, vector distance subsystem 216 compares out-of-domain vector embeddings 212 to in-domain vector embedding(s) 214 to determine low distance cluster of out-of-domain data 218, medium distance cluster of out-of-domain data 220, and high distance cluster of out-of-domain data 222. Model tuning subsystem 224 uses a selected one or more of clusters 218, 220, and 222 to tune a text generation model, resulting in tuned text generation model 228. In one example, model tuning subsystem 224 uses high distance cluster of out-of-domain data 222 to tune the model in a first iteration, resulting in a first tuned model. Then, model tuning subsystem 224 uses medium distance cluster of out-of-domain data 220 to tune the first tuned model in a second iteration, resulting in a second tuned model. Then, in a next iteration, model tuning subsystem 224 uses low distance cluster of out-of-domain data 218 to tune the second tuned model, resulting in tuned text generation model 228. Tuned text generation model 228 is considered to be based on clusters 218, 220, and 222, even though tuned text generation model 228 was generated iteratively using different clusters of out-of-domain data in different iterations, starting with highest distance clusters and proceeding to lowest distance clusters. Data transformation system 202 or another system may receive input 230 containing non-textual digital media content and use tuned text generation model 228 to generate output 232 containing or based on corresponding textual content 232.

In various examples, this approach outperformed baseline approaches by 11.3% (2.5 Word Error Rate points) on average.

The data transformation system tunes a speech recognition model by adapting the model to a target domain using training data not specific to the target domain but starting with training data further from the target domain before tuning with training data closer to the target domain to provide a robust speech recognition model with low resources in the target domain.

Automatic Speech Recognition (ASR) systems based on fine-tuned versions of large pre-trained speech models like HuBERT and wav2vec 2.0 can achieve impressive performance, even in low-resource settings. In practical applications, obtaining an adequate amount of target-domain data for fine-tuning can be challenging due to budget limitations or privacy concerns. A potential solution to this issue is to select subsets from a pre-existing and readily available pool of transcribed audio data, such as open-source datasets, that are anticipated to be representative of the target domain. Once the subsets are selected, they are used as training data to bootstrap the ASR creation process. In some examples, the selected data is provided to the model in an ad-hoc, random manner during training. This ad-hoc manner may be modified to yield better results in many examples.

The data transformation system uses an Unsupervised Domain-Aware training Curriculum (U-DAC) approach based on the distance of the selected examples from the target domain. Compared to other scenarios of curriculum domain adaptation in speech and other fields such as Neural Machine Translation and computer vision, the U-DAC approach uses much less target-domain data (e.g. as little as 15, 20, 25, 30, 35, 40, 45, 50, 55, 60, 65, 70, 75, 80, 85, 90, 95, 100, 105, 110, 115, 120, 180, 240, 300, 400, 500, 600, 700, 800, 900, or 1000 seconds). In various examples, one minute of target domain data is used, but other examples may use more or less target domain data and still achieve positive results. The U-DAC method includes ranking the examples according to their distance to the target domain, by using unsupervised k-nearest neighbor (KNN) search. Instead of ordering the training samples in terms of difficulty and/or learning complexity, the data transformation system rearranges the training samples according to their KNN mean values, such that samples more distant to the target domain are seen earlier during training and more similar ones later on.

Examples of this method are provided in examples, where a data pool with seven datasets from the ESB benchmark, a benchmark used to evaluate ASR systems across speech domains. In these examples, the U-DAC method improved the Word Error Rate (WER) compared to the state-of-art data selection with a random shuffling method by up to 11.3% (2.5 points) and to random data selection by 17.2% (4.1 points). Additional detail about curriculum learning is provided in Y. Bengio, J. Louradour, R. Collobert, and J. Weston, "Curriculum learning," in *Proceedings of the* 26$^{th}$ *Annual International Conference on Machine Learning*, ser. ICML '09. New York, NY, USA: Association for Computing Machinery, 2009, p. 41-48. [Online]. Available: https://doi.org/10.1145/1553374.1553380, which is incorporated herein by reference in its entirety for all purposes. Curriculum learning may include two steps: ranking the samples from easy to hard, and finding the right pacing function for introducing more difficult data. Curriculum learning can provide improvements over standard random training data shuffling, without any additional computational costs.

In Speech-related tasks, curriculum learning may be adopted to improve noise robustness, speaker detection and speech recognition. Additional detail about using curriculum learning to improve noise robustness is provided in S. Indurthi, S. Chollampatt, R. Agrawal, and M. Turchi, "CLAD-ST: Contrastive learning with adversarial data for robust speech translation," in *Proceedings of the* 2023 *Conference on Empirical Methods in Natural Language Processing*, H. Bouamor, J. Pino, and K. Bali, Eds. Singapore: Association for Computational Linguistics, December 2023, pp. 9049-9056. [Online]. Available: https://aclanthology.org/2023.emnlp-main.560, which is incorporated herein by reference in its entirety for all purposes. Additional detail about using curriculum learning for speaker detection is provided in H.-S. Heo, J. weon Jung, J. Kang, Y Kwon, Y. J. Kim, B.-J. Lee, and J. S. Chung, "Curriculum learning for self-supervised speaker verification," *INTERSPEECH* 2023, 2022. [Online]. Available: https://api.semanticscholar.org/CorpusID:253397654, which is incorporated herein by reference in its entirety for all purposes. Additional detail about using curriculum learning for speech recognition is provided in G. Karakasidis, T. Grósz, and M. Kurimo, "Comparison and analysis of new curriculum criteria for end-to-end ASR," in *Interspeech* 2022, 23$^{rd}$ *Annual Conference for the International Speech Communication Association, Incheon, Korea,* 18-22, *September* 2022, H. Ko and J. H. L. Hansen, Eds. ISCA, 2022, pp. 66-70. [Online]. Available: https://doi.org/10.21437/Interspeech.2022-10046, which is incorporated herein by reference in its entirety for all purposes. Additional detail on using the length of utterances for ranking them and creating a curriculum is provided in D. Amodei, S. Ananthanarayanan, R. Anubhai, J. Bai, E. Battenberg, C. Case, J. Casper, B. Catanzaro, Q. Cheng, G. Chen, J. Chen, J. Chen, Z. Chen, M. Chrzanowski, A. Coates, G. Diamos, K. Ding, N. Du, E. Elsen, J. Engel, W. Fang, L. Fan, C. Fougner, L. Gao, C. Gong, A. Hannun, T. Han, L. Johannes, B. Jiang, C. Ju, B. Jun, P. LeGresley, L. Lin, J. Liu, Y. Liu, W. Li, X. Li, D. Ma, S. Narang, A. Ng, S. Ozair, Y. Peng, R. Prenger, S. Qian, Z. Quan, J. Raiman, V. Rao, S. Satheesh, D. Seetapun, S. Sengupta, K. Srinet, A. Sriram, H. Tang, L. Tang, C. Wang, J. Wang, K. Wang, Y. Wang, Z. Wang, Z. Wang, S. Wu, L. Wei, B. Xiao, W. Xie, Y. Xie, D. Yogatama, B. Yuan, J. Zhan, and Z. Zhu, "Deep speech 2: End-to-end speech recognition in english and mandarin," in *Proceedings of The* 33$^{rd}$ *International Conference on Machine Learning*, ser. Proceedings of Machine Learning Research, M. F. Balcan and K. Q. Weinberger, Eds., vol. 48. New York, New York, USA: PMLR, 20-22 Jun. 2016, pp. 173-182. [Online]. Available https://proceedings.mlr.press/v48/amodei16.html, which is incorporated herein by reference in its entirety for all purposes. Additional detail on using an auto-encoder based semi-supervised approach that involved some in-domain data is provided in S. Zheng, G. Liu, H. Suo, and Y. Lei, "Autoencoder-based semi-supervised curriculum learning for out-of-domain speaker verification," in *Interspeech,* 2019. [Online]. Available https://api.semanticscholar.org/CorpusID:203164250, which is incorporated herein by reference in its entirety for all purposes. These approaches rank examples according to their difficulty or complexity, which is usually defined in terms of a corresponding model learned on in-domain data. Using the U-DAC method, the data transformation system ranks data according to the data's distance to the target domain, in an unsupervised manner. Additional detail on curriculum learning for domain adaptation is provided in X. Zhang, P. Shapiro, G. Kumar, P. McNamee, M. Carpuat, and K. Duh, "Curriculum learning for domain adaptation in neural machine translation," in *Proceedings of the* 2019 *Conference of the North American Chapter of the Association for Computational Linguistics: Human Language Technologies, Volume* 1 (*Long and Short Papers*), J. Burstein, C. Doran, and T. Solorio, Eds. Minneapolis, Minnesota: Association for Computational Linguistics, June 2019, pp. 1903-1915. [Online]. Available: https://aclanthology.org/N19-1189, which is incorporated herein by reference in its entirety for all purposes.

Unlike Zhang et al., the U-DAC method defines the difficulty of the examples in terms to the examples' distance to a target domain and does not assume a supervised setup with a single source-target domain pair. Unlike the target domain, a source domain is a first domain on which a model has already been trained. If determining a distance between a model trained in the source domain and a model trained in the target domain, an assumption must already be made that there is enough data to train a model in the target domain. The U-DAC method performs similarity measures on a small sample of target domain training data and larger samples of out-of-domain training data before tuning a model that was not trained in the target domain.

Figure 7:
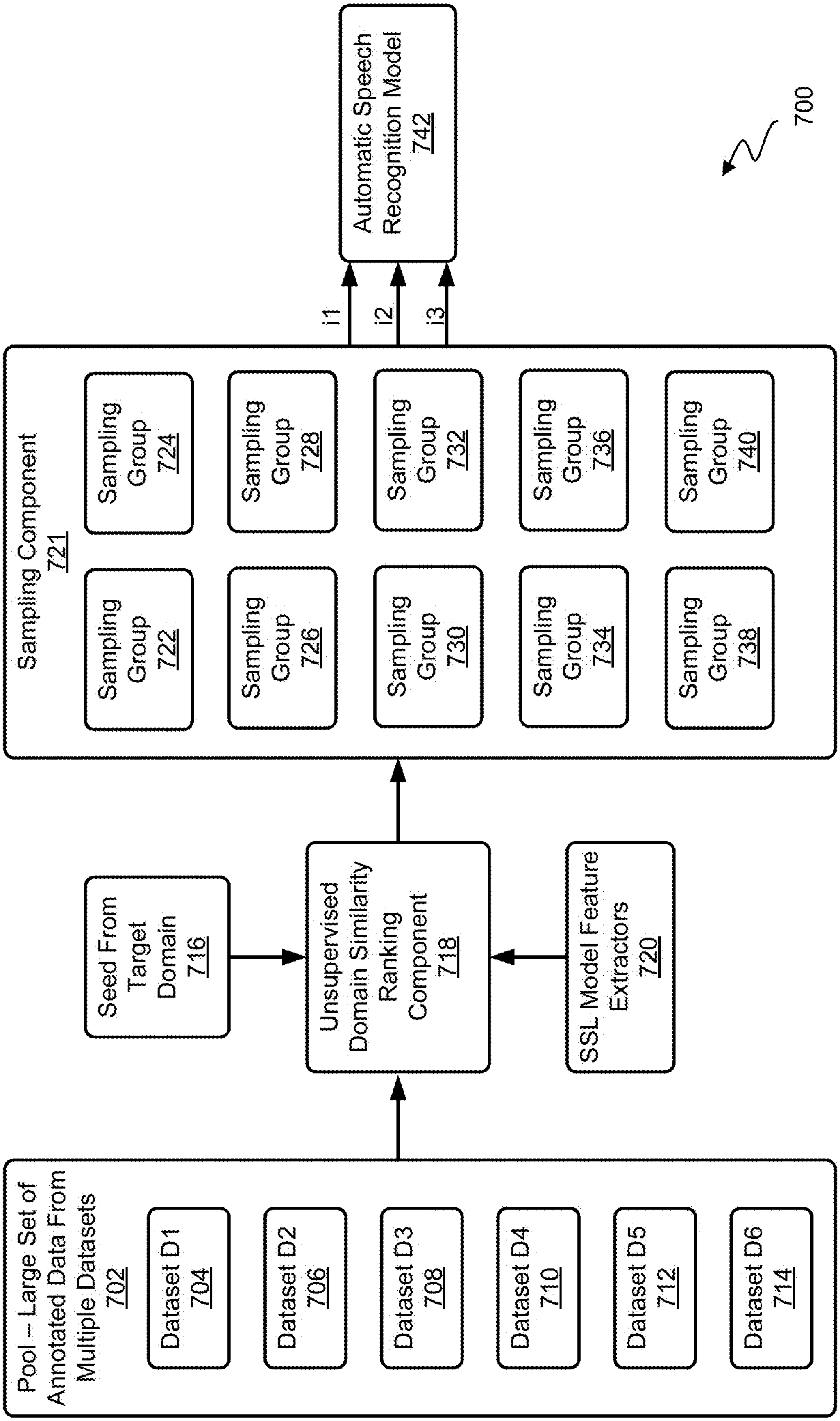
FIG. 7 shows a diagrammatic overview of an example implementation of unsupervised domain-aware curriculum (U-DAC).

The U-DAC method may rank the training examples and implement a sampling procedure based on this ranking. FIG. 7 shows a diagrammatic overview of an example implementation of U-DAC. As shown, a pool 702 includes a large set of annotated data from multiple datasets, such as dataset D1 704, dataset D2 706, dataset D3 708, dataset D4 710, dataset D5 712, and dataset D6 714. An unsupervised domain similarity ranking component 718 uses SSL model feature extractors 720 (for audio and text, e.g., Wav2Vec2 or SentenceBert) to determine similarities or differences between seed from target domain 716 (e.g., 60 seconds of audio) and datasets 704-714 (e.g., ~6000 hours of audio and transcribed text). Sampling component 721 stores sampling groups 722-740 resulting from ranking groups of datasets 704-714 based on proximity to seed from target domain 716 (e.g., ~100 hours of audio and transcribed text). Sampling group(s) furthest from seed from target domain 716 may be used to first tune automatic speech recognition model 742 in iteration i1. Sampling group(s) next furthest from seed from target domain 716 may be used to next tune automatic speech recognition model 742, after keeping a best checkpoint from tuning in iteration i1, to produce another best checkpoint of tuning automatic speech recognition model 742 in iteration i2. Sampling group(s) next furthest or, if no other furthest groups remain, closest to seed from target domain 716 may be used to next tune a pre-existing textual content generation model (e.g., an automatic speech recognition model) 742, after keeping the other best checkpoint from iteration i2, to produce another best checkpoint of tuning automatic speech recognition model 742 in iteration i3. The tuning process may continue to use sampling groups 722-740 ordered based on proximity to seed from target domain 716. In another arrangement shown in FIG. 7, embeddings selected by the k-nearest neighbor selection component 620 in FIG. 6 are fed to sampling component 721 for tuning the pre-existing textual content generation model 742 at 110/112 in FIG. 1A and FIG. 1B.

Domain similarity ranking may be determined by the data transformation system in an unsupervised manner. Instead of ranking samples according to their learning difficulty, the data transformation system may use their distance to the target domain. In one embodiment, the data transformation system uses a data selection method based on distance to the target domain using vector embeddings generated from a model trained or tuned on one or more other characteristics that at least partially overlap with content of the target domain but are not labeled for the target domain. For example, the data transformation system may use a limited seed from the target domain, such as at least one one-minute seed, and a large pool of out-of-domain data that overlaps with the target domain on one or more characteristics that are labeled for the out-of-domain data but not labeled for the target domain data. The data transformation system may use Self Supervised Learning (SSL) pre-trained models, such as sentence-bert and wav2vec 2.0, to extract text and audio SSL embeddings for all data. Mean pooling is applied to the audio embeddings at the utterance level, and the extracted audio and text SSL embeddings may be concatenated in one embodiment. The data transformation system may calibrate the concatenated embeddings using a Multi-Layer Perceptron (MLP), which takes the SSL embeddings as input and learns to output high-level domain-specific labels that could describe the target domain as well as other domains, based on the data and dataset labels in the pool. In one example, these labels include the ids (data origin), style, and genre of each dataset in the out-of-domain (OOD) pool, as shown in Table 1.

TABLE 1

Details of datasets from the English ESB benchmark applied to the examples.

| Dataset | Genre | Style | Train/Val/Test |
|---|---|---|---|
| LibriSpeech | Audiobook | N | 960/11/11 |
| CommonVoice | Wikipedia | N | 1409/27/27 |
| TED-LIUM | TED talks | O | 454/2/3 |
| VoxPopuli | EU Parl. | O | 523/5/5 |
| AMI | Meetings | S | 78/9/9 |
| Earnings-22 | Meetings | O, S | 105/5/5 |
| GigaSpeech | Audiobook, podcast, YouTube | N, S | 2500/12/40 |

N stands for Narrative, O for Oratory and S for Spontaneous speech.

The MLP may be trained in a multi-task manner with the outputs. Upon training completion, the data transformation system extracts domain-calibrated embeddings, calibrated to the overlapping high-level or shared characteristic domain, from the last hidden layer of the network. The data transformation system then combines the domain-calibrated embeddings with a KNN search component, enabling the selection of the most similar items between the seed and the pool. In other words, the data transformation system treats the seed as a query and matches the seed to the most similar items in the pool using a distance function, such as the Euclidean distance.

The KNN search component can be implemented using any vector similarity search library. Once data selection is done, the data transformation system uses the KNN distance values of the OOD samples to the seed examples to rank the selected data. The data transformation system may return duplicates, which are different examples from the seed matched to the same sample from the OOD pool. For instance, Table 2 illustrates an example duplication ratio from selected ESB benchmark examples.

TABLE 2

Data selection deduplication statistics based on examples with the ESB benchmark. The numbers correspond to sums over 3 different seeds.

| Dataset | Deduplicated Items | Total Items | Duplication Ratio |
|---|---|---|---|
| LibriSpeech | 208808 | 247238 | 15.54% |
| CommonVoice | 190376 | 215940 | 11.84% |
| TED-LIUM | 275452 | 297968 | 7.56% |
| VoxPopuli | 191761 | 201310 | 4.74% |
| AMI | 340111 | 547612 | 37.89% |
| Earnings-22 | 272170 | 306371 | 11.16% |
| GigaSpeech | 251008 | 282192 | 11.05% |
| Total | 1729686 | 2098631 | 17.58% |

Figure 8:
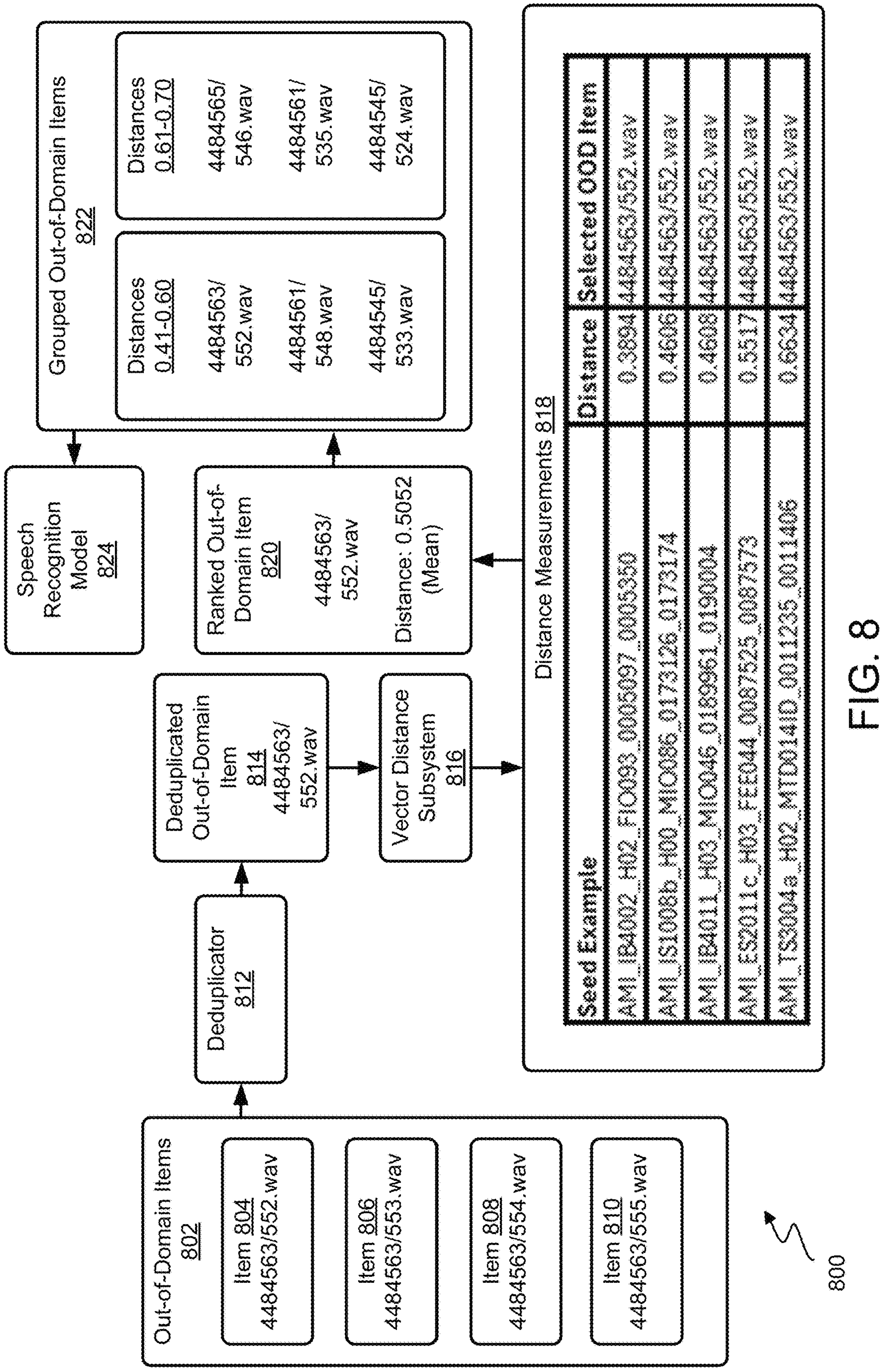
FIG. 8 shows a diagram of an example of a complex object created to enable ranking in U-DAC.

In the data selection case, deduplication based on the id of the item from the pool may be enough in some embodiments. In one embodiment, the data transformation system uses the distance of the pair "seed example"–"pool item" to define the final rank of the pool item and thus directly impact downstream curriculum. To calculate the final score of each OOD item, the data transformation system calculates the mean score given by all "seed example"–"pool item" pairs for each pool item. FIG. 8 shows an example of a complex object created to enable ranking in U-DAC. As shown, out-of-domain items 802 may include item 804, item 806, item 808, and item 810. The out-of-domain items 802 may include some items that are identical to each other even though they are from same or different datasets. Deduplicator 812 consumes out-of-domain items 802 and determines the items are all identical to deduplicated out-of-domain item 814, which is identified as item 804. Deduplicated item 814 is fed into vector distance subsystem for determining a distance from seed examples, resulting in distance measurements 818. As shown, deduplicated out-of-domain item 814 appears as ranked out-of-domain item 820 with a corresponding distance from the target domain determined, in the example, as the mean distance from distance measurements 818. Note that other scoring strategies, such as keeping only min or max or other aggregate distances, could also be used. Ranking is based on the aggregate scores, as the ranked out-of-domain item 820 is placed into grouped out-of-domain items 822 according to the distance from the target domain (0.5052, in the example, which appears in the grouping with distances from 0.41 to 0.60). Grouped out-of-domain items 822 may then be used to train or tune speech recognition model 824, with higher-distanced group(s) being used first and lower-distanced group(s) being used later. Each iteration of training or tuning speech recognition model 824 results in a best checkpoint of speech recognition model 824 that is used for training or tuning with the closer-distanced group(s) of items from grouped out-of-domain items 822.

In one embodiment, although the sampling is unsupervised in the sense that in-domain labels are not provided, the sampling is domain-aware in the sense that the pool of samples have been determined based on proximity to the domain. A sampling component of the data transformation system may evenly divide the training data into m distinct groups according to their ranking. The division can be based either on the number of samples or the audio duration. Each group contains samples with similar distance values. Groups may be ranked from 1 to m according to their distance to the domain, with group 1 being the most distant and m the least distant one, for example.

Accordingly, the training procedure is also segmented into m distinct, consecutive phases. At each phase i<=m the corresponding group i is available for training. So, during the first phase only the most distant group of data is used for training, up to a stopping criterion being satisfied (e.g. number of iterations). Then a new training phase starts with the next most distant group and so on. At the beginning of each phase i, the model is initialised with the best checkpoint created in the previous phase i−1. When i=1, i.e. at the first phase, a pre-trained model is used as the starting point e.g. wav2vec 2.0. Since each phase can be viewed as training on a new dataset, neural network training optimizations such as random shuffling and mini-batching can be employed.

In one embodiment, the data transformation system uses the same example subset and configuration of the ESB benchmark for validation of the techniques. Details of the examples are shown in Table 1. Each dataset represents a separate domain. For the data selection step, training subsets of our datasets may be indexed, for example using FAISS. The data transformation system also extracts randomly three 1-minute samples per dataset from the validation subset as seeds, in order to be able to compute standard deviation. In the examples, the data transformation system then matches the examples from the seeds to the samples indexed by FAISS to create 10, 50, and 100 hour training data budgets. The data transformation system ranks the samples based on distance to the target domain. In one embodiment, the distance metric is determined based on squared Euclidean distance, as implemented in FAISS. In other embodiments, the distance may be determined based on a variety of distance metrics either alone or in combination (for example, Cosine Distance, Euclidean Distance, Pearson Correlation Coefficient, Manhattan Distance, Minkowski Distance, Hamming Distance, Chebyshev Distance, Jaccard Distance, Haversine Distance, and/or Sorensen-Dice Distance, or any one or a combination thereof).

In the examples, the data transformation system may evenly distribute the number of samples in the training budget into 4 groups, which are used for sampling. In one embodiment, for both the seed and the pool, the data transformation system extracts the embeddings for each item from the 9th layer of the wav2vec 2.0 Base model and applies utterance-level mean pooling before indexing. Additional details about extracting embeddings from content are provided in (1) P. Cormac English, J. D. Kelleher, and J. Carson-Berndsen, "Domain-informed probing of wav2vec 2.0 embeddings for phonetic features," in *Proceedings of the 19$^{th}$ SIGMORPHON Workshop on Computational Research in Phonetics, Phonology, and Morphology*. Seattle, Washington: Association for Computational Linguistics, July 2022, pp. 83-91. [Online]. Available: https://aclanthology.org/2022.sigmorphon-1.9; and (2)Y. K. Singla, J. Shah, C. Chen, and R. R. Shah, "What do audio transformers hear? Probing their representations for language delivery structure," in 2022 *IEEE International Conference on Data Mining Workshops* (*ICDMW*), 2022, pp. 910-925, each of which is incorporated herein by reference in its entirety for all purposes. For the text, in one embodiment, the data transformation system use the all-MiniLM-L6-v2 model of sentence-bert.

In various examples, the data transformation system uses the SpeechBrain framework to fine-tune the ASR models. Specifically, the data transformation system may incorporate a 3-layer dense module, each layer containing 1024 units and activated by LeakyReLU functions, on top of the wav2vec 2.0 large model (LS960h). A randomly initialized output layer is employed to predict characters. During fine-tuning, the data transformation system unfreezes the part of the wav2vec2 model that corresponds to the Convolutional Neural Network (CNN) feature extractor. The Adam optimizer may be used for wav2vec 2.0 and Adadelta (learning rate: 0.9, decay rate: 0.95, epsilon: 1.e-8) for the dense module. Additionally, a scheduler based on the newbob technique may be employed for learning rate annealing with the following parameters: improvement threshold: 0.0025, annealing factor: 0.8, patience: 0. In various examples, the learning rates that are given to Adam and the number of iterations per dataset are listed in Table 3. The model may be fine-tuned with a Connectionist Temporal Classification (CTC) loss. In one embodiment, language models are not used or needed by the data transformation system, improving efficiency.

TABLE 3

Details of fine-tuning hyper-parameters per dataset.

| Dataset | Learning Rate | Iterations | Batch |
|---|---|---|---|
| LibriSpeech | 1e−4 | 16000 | 36 |
| CommonVoice | 2.5e−5 | 16000 | 24 |
| TED-LIUM | 5e−5 | 16000 | 24 |
| VoxPopuli | 5e−5 | 16000 | 24 |
| AMI | 5e−5 | 16000 | 36 |
| Earnings-22 | 1e−4 | 16000 | 24 |
| GigaSpeech | 5e−5 | 16000 | 24 |

In one embodiment, a Multi-Layer Perceptron is configured as the domain-calibrated feature extractor used for data selection.

In one embodiment, to validate various examples, the data transformation system extracts three seeds from the validation subset of each dataset in turn. At each turn the dataset from which the seeds are extracted is considered as the target domain, so the dataset's train subset is removed from the pool. In other words, data from the target domain might not be included in the corresponding training data budget.

Example results of the example iterations of the U-DAC process for the 100 hour budget are shown in Table 4.

For validation, example results of an example U-DAC process may be compared to a random selection approach. Example results of comparing the U-DAC process are shown in Table 4.

the out-of-domain training budgets increased past 50 hours to 100 hours. With larger datasets, sample diversity may cover different aspects of the target domain more sufficiently. Data diversity in each group may be further controlled by clustering the samples and selectively sampling from each cluster to produce diverse datasets.

In addition, training budgets of OOD may be optimized by the data transformation system at 50-100 hours or more. In some examples, as the budget increases, more out-of-domain data that is irrelevant to the target domain may be selected. In other examples, additional training budgets do not impact the quality of data. After a certain amount of training data, additional benefit may be incremental, leading to an optimal training budget size for different samples and in different use cases for different domains. U-DAC may be more robust to larger samples as in the examples.

In real-world settings, the availability and the amount of target-domain data needed for fine-tuning an Automatic Speech Recognition system can be limited. To deal with such settings U-DAC, an Unsupervised Domain-Aware Curriculum for ASR finetuning, may be used to provide tuning curriculum for the ASR system. In various embodiments, the data transformation system ranks out-of-domain curriculum according to their distance from the target domain, forms groups containing similar distance samples, and performs training on each group sequentially from the most-to-least distant, keeping each time the best checkpoint only for further training. In a particular example, this approach

TABLE 4

Example results in WER (100 hours of training budget) and Word Error Rate Reduction (WERR). In the example, standard deviation is computed on 3 seeds.

| Dataset | WER-Random | WER-DS | WER-U-DAC | WERR-U-DAC-DS | WERR-U-DAC-RANDOM | Improved Seeds |
|---|---|---|---|---|---|---|
| LibriSpeech-clean | 6.75 ± 0.35 | 6.59 ± 0.45 | 4.63 ± 0.10 | 29.71 | 31.44 | 3/3 |
| LibriSpeech-other | 14.44 ± 0.58 | 14.31 ± 0.41 | 10.74 ± 0.05 | 24.92 | 25.62 | 3/3 |
| CommonVoice | 37.31 ± 0.43 | 35.55 ± 1.47 | 32.77 ± 0.44 | 7.81 | 12.17 | 3/3 |
| TED-LIUM | 14.49 ± 2.07 | 11.74 ± 0.62 | 9.34 ± 0.9 | 20.44 | 35.53 | 3/3 |
| VoxPopuli | 19.32 ± 0.23 | 17.37 ± 0.86 | 15.62 ± 0.24 | 10.08 | 19.18 | 3/3 |
| AMI | 39.33 ± 0.96 | 34.60 ± 1.73 | 32.14 ± 0.6 | 7.1 | 18.28 | 3/3 |
| Earnings-22 | 38.84 ± 0.72 | 36.76 ± 1.91 | 32.65 ± 1.3 | 11.2 | 15.95 | 3/3 |
| GigaSpeech | 21.13 ± 0.22 | 21.81 ± 0.67 | 20.59 ± 0.74 | 5.58 | 2.82 | 2/3 |
| Averages | 23.95 ± 0.77 | 22.34 ± 1.10 | 19.81 ± 0.55 | 11.32 | 17.29 | |

In the example, U-DAC performed better by 2.52 WER points compared to the DS method and by 4.14 WER points compared to the random selection baseline, which corresponds to Word Error Rate Reduction (WERR) of 11.32% and 17.29% respectively. In addition, the standard deviations in the examples were low, ranging from 0.55 for U-DAC to 1.1 for DS.

In the examples, WERR improvements were observed for Librispeech and Tedlium, ranging at values higher than 20%. Performance of the data selection method may have a direct impact on U-DAC's performance. In the examples, the performance for all three seeds used in the experiments was improved when U-DAC is used, as compared to DS, with the exception of one example using Gigaspeech.

Figure 9:
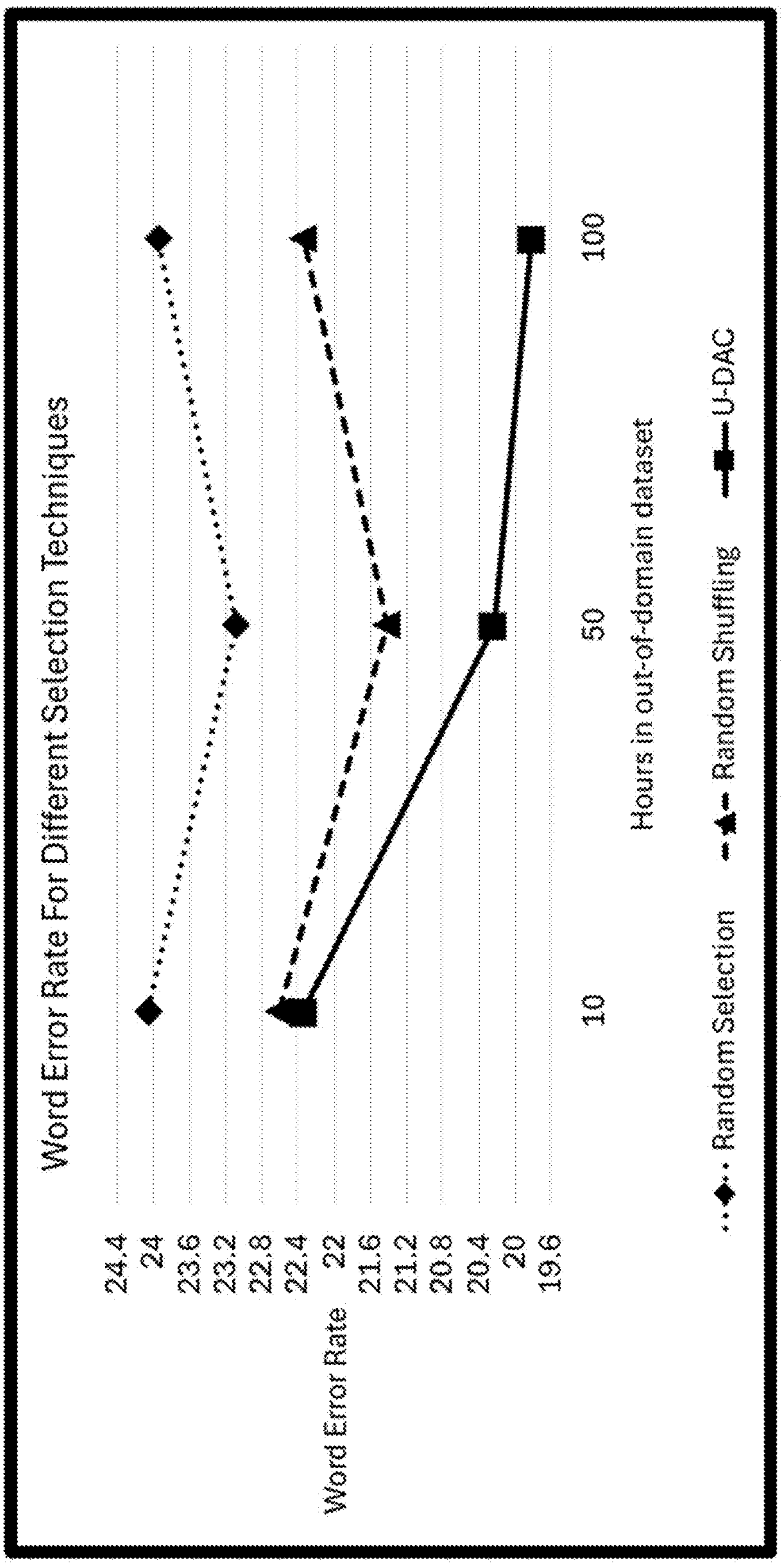
FIG. 9 shows example Word Error Rates for different example training budgets.

FIG. 9 shows example Word Error Rates for different example training budgets. As shown in FIG. 9, U-DAC performs well when a large (e.g., 50-100 hours or more) out-of-domain (OOD) training budget is available. In contrast, random selection and random shuffling showed higher word error rates overall and increases in word error rates as outperforms by 11.3% (2.5 Word Error Rate points) on average a state-of-art unsupervised data selection baseline and by 17.3% (4.1 Word Error points) a random selection baseline. The diversity of each samples may be further controlled using clustering and selective sampling to promote coverage of the target domain by each sample.

Transforming Different Forms of Non-Textual Digital Media Content into Text

In various embodiments, the different items of non-textual digital media content may be same or different ones of audio files, video files, image files, images of handwriting, and/or audiovisual files. Regardless of the type of media content, a model may be trained to detect background characteristic(s) of the media content in out-of-domain data, and the trained model may be used to extract vector embedding(s) from small amounts of in-domain data for comparison with vector embeddings from out-of-domain data. The samples of out-of-domain data may be used for training based at least in part on the distance from the vector embedding(s) of in-domain data.

Transforming Non-Textual Digital Media Content into Text for Query Processing

The textual content generation model as tuned by selected set(s) of out-of-domain data, optionally ordered based on distance from the target domain, may be used to transform unlabeled item(s) of non-textual digital media content item(s) of corresponding textual content. For example, unlabeled non-textual digital media content item(s) may be received as quer(ies) to a query processing system, and the query processing system may transform the unlabeled non-textual digital media content item(s) into corresponding textual content using the tuned textual content generation model. The corresponding textual content may be submitted to a search engine, large language model, or other language processing model in order to generate a query result. The query result may be used to trigger an action, cause information, such as the query result, to be displayed on the screen, and/or stored as part of a dataset that logs the textual representations of queries received.

Figure 3:
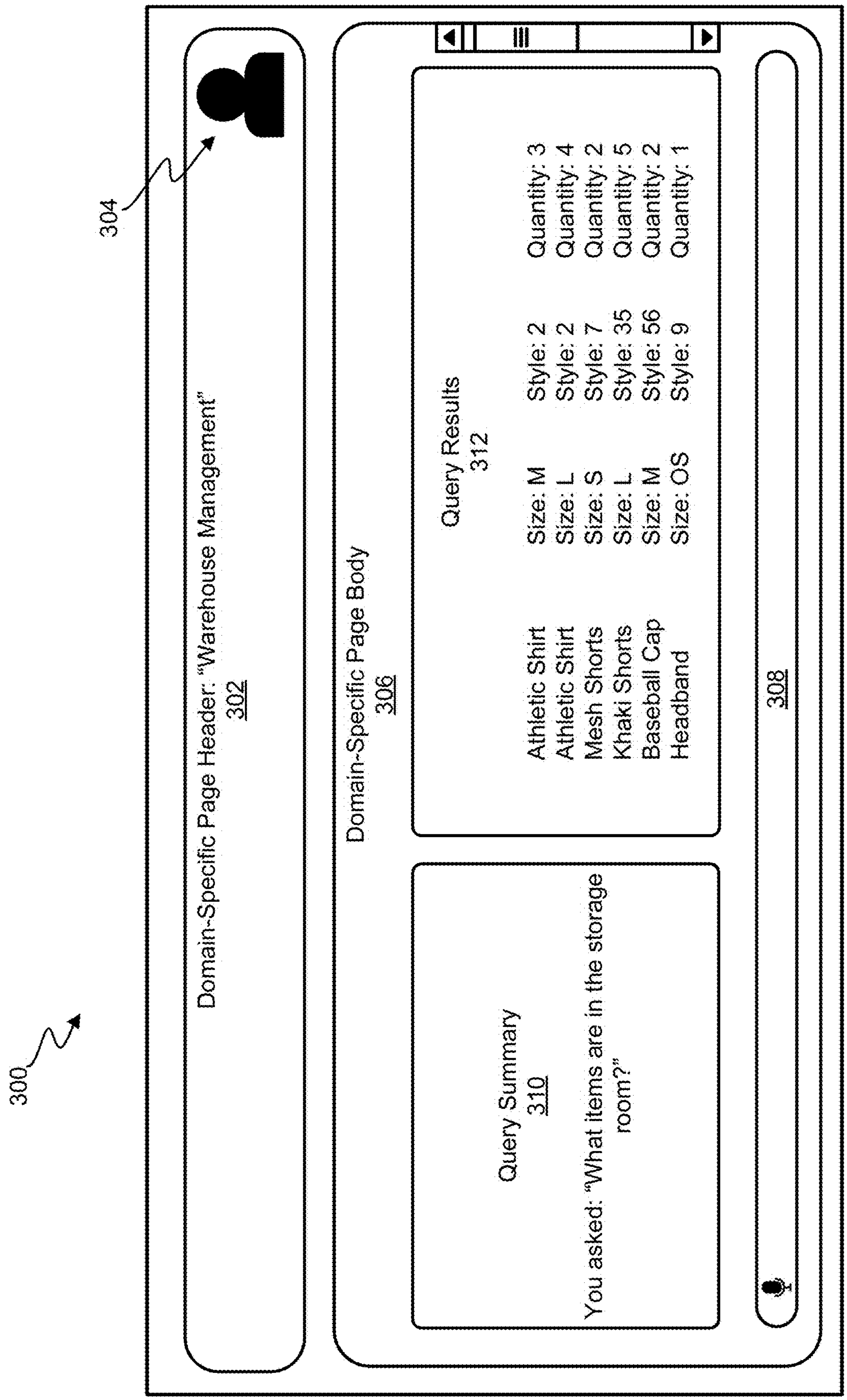
FIG. 3 illustrates a diagram of an example user interface showing a transcription of an audio data query and a textual response to the query.

FIG. 3 illustrates a diagram of an example user interface 300 showing a domain-specific page header 302 with a user logged in as user 304. User interface 300 include domain-specific page body 306, including a transcription of an audio query 310 ("What items are in the storage room?"), which may be specific to a domain of audio from the user, and a textual response to the query as query results 312. The query may be provided in textual form using input 308 or in audio form using the microphone option for input 308. In this example, the query was provided in audio form.

Transforming Non-Textual Digital Media Content into Text for Robotic Control Systems In one embodiment, the unlabeled non-textual digital media content item(s) are received as input, such as instructions, requests, or commands, to a robotic system, or a control system of a robotic system or other mechanical system that physically operates in an environment to perform task(s), optionally manipulating physical object(s) in the environment. The control system may transform the unlabeled non-textual digital media content item(s) into corresponding textual content using the tuned textual content generation model. The corresponding textual content may be submitted to a language processing model in order to generate instructions for the mechanical system. For example, the instructions may request that the mechanical system perform task(s) with respect to object(s) in the environment. The mechanical system may provide audio and/or visual response(s) to the instructions, such as an audio (e.g., spoken via a speaker) or visual (e.g., displayed on a digital display) confirmation of what task(s) are to be performed, what object(s) are to be manipulated, an expected result of the task(s) or manipulation(s), and/or an amount of time or other resources that the task(s) or manipulation(s) are expected to take. In one example, the control system may detect a language or dialect of the request and provide the audio or visual response in the same language or dialect.

Computer System Architecture

Figure 4:
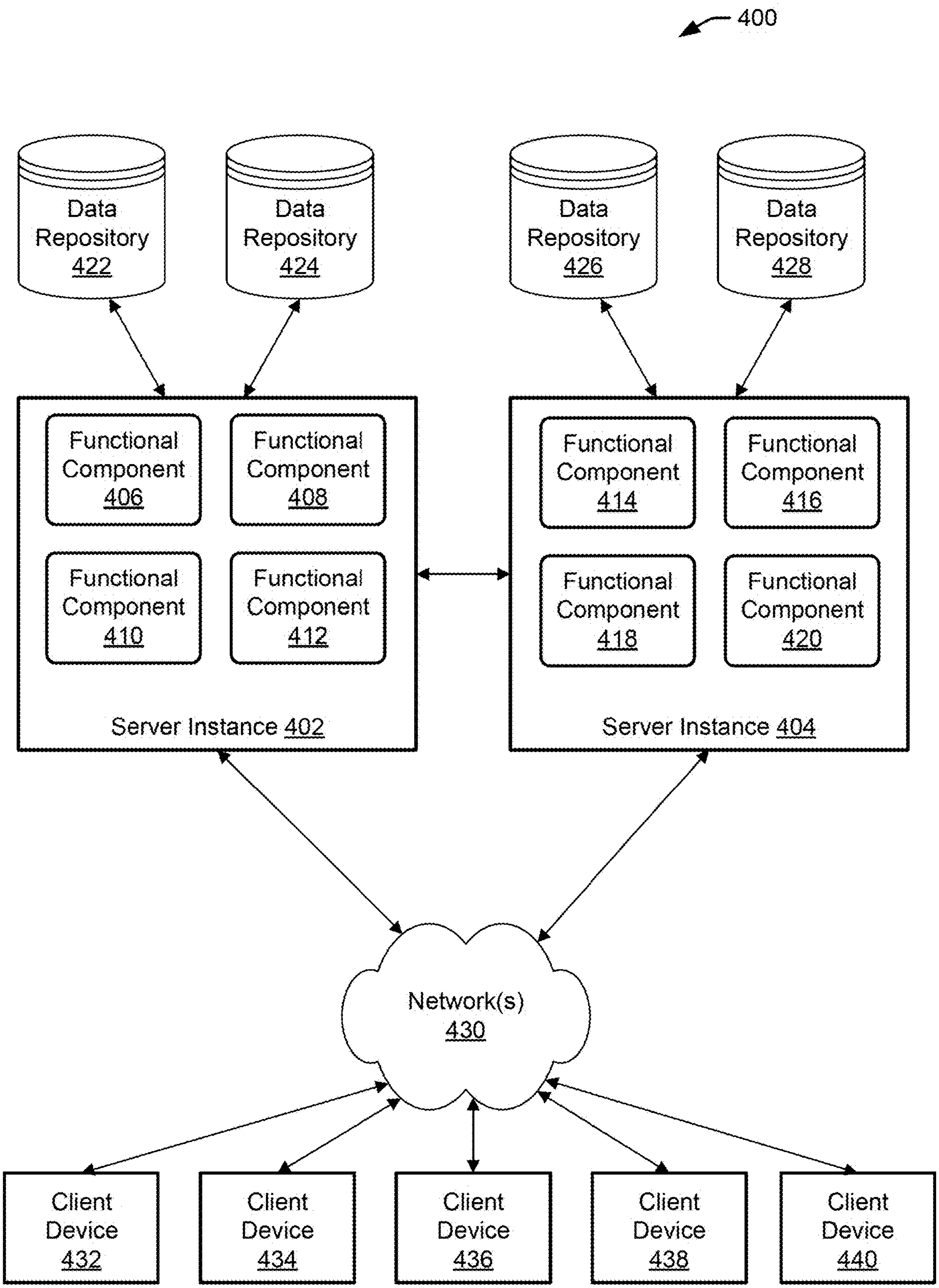
FIG. 4 illustrates a diagram of a distributed system for fine-tuning a text generation model using out-of-domain data based on limited domain-specific clues determined from similarities between out-of-domain data and in-domain data on background characteristic(s).

FIG. 4 illustrates a diagram of a distributed system 400 for fine-tuning a text generation model using out-of-domain data based on limited domain-specific clues determined from similarities between out-of-domain data and in-domain data on background characteristic(s).

As shown, client computing devices 432, 434, 436, 438, and/or 440 are in communication with server instances 402 and/or 404 via one or more communication networks 430. Users may use the client computing devices to access services offered by the server instances 402 and/or 404. The client computing devices may include smart phones or other portable handheld devices, general purpose computers such as personal computers and laptops, workstation computers, personal assistant devices, wearable devices, equipment firmware, gaming systems, etc.

Server instance 402 includes functional components 406, 408, 410, and 412 that provide functionality to support services offered by server instance 402. For example, the functionality may be provided via web pages or applications that may be accessed via client devices 432, 434, 436, 438, and/or 440. The functionality may retrieve data, perform computations on the data, sort, filter, or select the data, and cause display of information on client devices 432, 434, 436, 438, and/or 440. Server instance 402 may interact with data repositories 422 and 424 to store and retrieve data to support services offered.

Server instance 404 includes functional components 414, 416, 418, and 420 that provide functionality to support services offered by server instance 404. For example, the functionality may be provided via web pages or applications that may be accessed via client devices 432, 434, 436, 438, and/or 440. The functionality may retrieve data, perform computations on the data, sort, filter, or select the data, and cause display of information on client devices 432, 434, 436, 438, and/or 440. Server instance 404 may interact with data repositories 426 and 428 to store and retrieve data to support services offered. Server instances 402 and 404 may also communicate with each other to support services offered, utilizing functionality offered by functional components of another server instance to provide a more comprehensive service to client devices 432, 434, 436, 438, and/or 440.

These client and server devices may use various operating systems, such as any of Microsoft Windows®, Apple MacOS®, UNIX® or UNIX-like operating systems, Linux® or Linux-like operating systems, Android®, and Apple iOS®, which provide software access to underlying hardware resources.

The data repositories 422, 424, 426, and 428 store data, which may include instructions, stored objects, server instance activity logs, and other data. Server instances 402 and 404 may each be computer systems as described in FIG. 5 or may be hosted virtually on computer systems that also provide other functionality or host other server instances using shared and non-shared resources of the host computer system.

Figure 5:
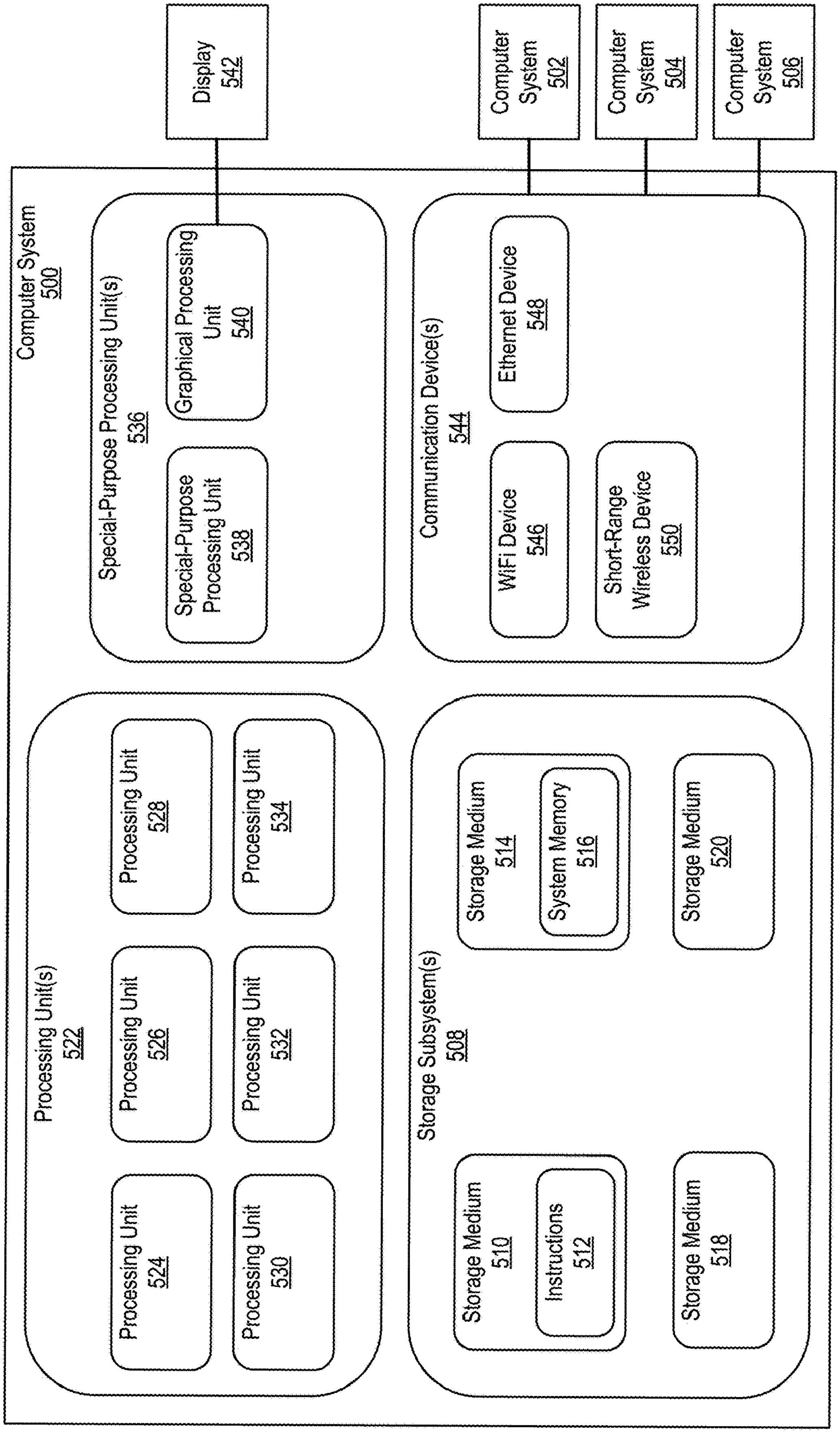
FIG. 5 illustrates an example computer system that may be used to fine-tune a text generation model using out-of-domain data based on limited domain-specific clues determined from similarities between out-of-domain data and in-domain data on background characteristic(s).

FIG. 5 illustrates an example computer system 500 that may be used to fine-tune a text generation model using out-of-domain data based on limited domain-specific clues determined from similarities between out-of-domain data and in-domain data on background characteristic(s).

As shown, the computer system 500 includes storage subsystem(s) 508, which may include storage media 510, 514, 518, and 520. Storage medium 510 may include stored instructions, for example, for carrying out application or server functionality. Storage medium 514 may include system memory 516 for managing objects that are being manipulated by computer system 500 during execution of an application or provision of a service. Storage sub-system(s) 508 may include one or more non-transitory computer-readable storage media, which may be in the form of removable and tangible computer program products or non-removable and tangible storage hardware, storing instructions which, when executed on the one or more data processors such as processing unit(s) 522, special-purpose processing unit(s) 536, or computer systems 502, 504, or 506, cause the one or more data processors to perform part or all of one or more methods disclosed herein. The term computer-readable medium, as used herein, does not encompass transitory electrical or electromagnetic signals propagating through a medium (such as on a carrier wave); the term computer-readable medium may therefore be considered tangible and non-transitory. The non-transitory computer-readable media may be volatile media that is available when computer system 500 or the media itself is powered, or non-volatile storage media such that the information contained thereon may survive a power-down event for the computer-system or for the media itself.

Processing unit(s) 522 may include processing units 524, 526, 528, 530, 532, and 534. The processing unit(s) may operate separately or otherwise independently, or in coordination together to accomplish complex tasks using parallel processing of sub-operations to be carried out as part of the complex tasks. Processing unit(s) may store information in storage subsystem(s) 508 as tasks are carried out.

Special-purpose processing unit(s) 536 may include special-purpose processing unit 538, such as a processing unit optimized for performing vector-based calculations to support machine learning operations. Special-purpose processing unit(s) 536 also include graphical processing unit 540, which communicates with processing unit(s) 522 and storage subsystem(s) 508 to display information on display 542.

Communication device(s) 544 may include WiFi device 546, Ethernet device 548, and/or short-range wireless device 550. WiFi device 546 and Ethernet device 548 may be part of a network device for communicating using a suite of communication protocols such as Transmission Control Protocol/Internet Protocol (TCP/IP) to communicate with other devices such as computer systems 502, 504, and 506 over the Internet. Short-range wireless device may also communicate with computer systems 502, 504, and 506 using short-range protocols such as BlueTooth®, Z-Wave®, and Zigbee®.

Computer system 500 may also include input devices such as mice, keyboards, touchscreens, touchpads, buttons, joysticks, and output devices such as display 542 and a speaker.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by a skilled technician or programmer. The computer programs include processor-executable instructions that are stored on at least one non-transitory, tangible computer-readable medium. The computer programs may also include or rely on stored data.

The computer programs may include: (i) descriptive or hierarchical text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. The terms "first," "second," "third," "fourth," "fifth," and "sixth" are naming conventions used so different items may be referred to separately and are not intended to convey an order or priority unless such order or priority is conveyed with other language. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a set of training data comprising a plurality of items of non-textual digital media content, wherein each item of the plurality of items of non-textual digital media content is labeled with corresponding textual content and one or more background characteristics that indicate an origination category of a plurality of candidate origination categories of the item of non-textual digital media content;

using one or more pre-trained machine learning models to generate vector embeddings of the set of training data;

using the generated vector embeddings to train another machine learning model to predict the one or more background characteristics;

using the one or more pre-trained machine learning models to generate a particular vector embedding that represents one or more particular items of non-textual digital media content other than the plurality of items of non-textual digital media content, wherein each particular item of the one or more particular items is labeled with corresponding textual content but not with any background characteristics that indicate any of the plurality of candidate origination categories of the particular item of non-textual digital media content;

using the other machine learning model to determine at least a first set of vector embeddings corresponding to the vector embeddings of the set of training data and a second particular vector embedding corresponding to the particular vector embedding that represents the one or more particular items of non-textual digital media content; wherein the first set of vector embeddings comprises a first vector embedding corresponding to a vector embedding of one or more first items of the plurality of items and a second vector embedding corresponding to a vector embedding of one or more second items of the plurality of items;

determining a first distance between the second particular vector embedding and the first vector embedding and a second distance between the second particular vector embedding and the second vector embedding;

based at least in part on the first distance and the second distance, generating a first tuned textual content generation model at least in part by tuning a textual content generation model on the one or more first items including first corresponding textual content of the one or more first items;

storing a particular tuned textual content generation model based at least in part on the first tuned textual content generation model;

using the particular tuned textual content generation model to transform one or more unlabeled items of non-textual digital media content to one or more items of corresponding textual content.

2. The computer-implemented method of claim 1, wherein generating the first tuned textual content generation model is based at least in part on the first distance being greater than the second distance, the computer-implemented method further comprising:

after generating the first tuned textual content generation model, generating a second tuned textual content generation model at least in part by tuning another particular tuned textual content generation model based at least in part on the first tuned textual content generation model, wherein generating the second tuned textual content generation model uses the one or more second items including second corresponding textual content of the one or more second items; and wherein the particular tuned textual content generation model is based at least in part on the first tuned textual content generation model by being based at least in part on the second tuned textual content generation model that is based at least in part on the first tuned textual content generation model.

3. The computer-implemented method of claim 1, wherein generating the first tuned textual content generation model is based at least in part on the first distance being lesser than the second distance, wherein the particular tuned textual content generation model is not based at least in part on the one or more second items.

4. The computer-implemented method of claim 1, wherein the one or more background characteristics comprise a content purpose, a manner of content delivery, and a source of content.

5. The computer-implemented method of claim 1, wherein the first distance and the second distance are distances determined based on a comparison of numerical vector coordinates between the second particular vector embedding and corresponding vector coordinates of another vector embedding.

6. The computer-implemented method of claim 1, wherein the one or more particular items of non-textual digital media content are in a target domain and are no more than 30 seconds long and no more than 50 in number.

7. The computer-implemented method of claim 1, wherein the plurality of items of non-textual digital media content are audio files.

8. The computer-implemented method of claim 1, wherein the one or more pre-trained machine learning models comprise a multi-layer artificial neural network, and wherein using the one or more pre-trained machine learning models to generate vector embeddings of the set of training data and using the one or more pre-trained machine learning models to generate the particular vector embedding comprise extracting vector embeddings from a hidden layer of the multi-layer artificial neural network.

9. The computer-implemented method of claim 8, wherein the multi-layer artificial neural network is a feed forward artificial neural network, and wherein the hidden layer is a last hidden layer of the feed forward artificial neural network.

10. The computer-implemented method of claim 1, wherein using the one or more pre-trained machine learning models to generate vector embeddings of the set of training data comprises representing parts of an individual item of the one or more first items with first separate vector embeddings, and aggregating the first separate vector embeddings, and representing parts of an individual item of the one or more second items with second separate vector embeddings, and aggregating the second separate vector embeddings; and wherein using the one or more pre-trained machine learning models to generate the particular vector embedding comprises representing parts of an individual item of the one or more particular items with particular separate vector embeddings, and aggregating the particular separate vector embeddings.

11. The computer-implemented method of claim 10, wherein aggregating the first separate vector embeddings comprises determining a mean value from the first separate vector embeddings, wherein aggregating the second separate vector embeddings comprises determining a mean value from the second separate vector embeddings, and wherein aggregating the particular separate vector embeddings comprises determining a mean value from the particular separate vector embeddings.

12. The computer-implemented method of claim 1, wherein the first distance and the second distance are determined based at least in part on a vector similarity search library.

13. A system comprising:

one or more processors;

one or more non-transitory computer-readable media storing instructions, which, when executed by the system, cause the system to perform a set of actions comprising:

accessing a set of training data comprising a plurality of items of non-textual digital media content, wherein each item of the plurality of items of non-textual digital media content is labeled with corresponding textual content and one or more background characteristics that indicate an origination category of a plurality of candidate origination categories of the item of non-textual digital media content;

using one or more pre-trained machine learning models to generate vector embeddings of the set of training data;

using the generated vector embeddings to train another machine learning model to predict the one or more background characteristics based on vector embeddings of non-textual digital media content;

using the one or more pre-trained machine learning models to generate a particular vector embedding that represents one or more particular items of non-textual digital media content other than the plurality of items of non-textual digital media content, wherein each particular item of the one or more particular items is labeled with corresponding textual content but not with any background characteristics that indicate any of the plurality of candidate origination categories of the particular item of non-textual digital media content;

using the other machine learning model to determine at least a first set of vector embeddings corresponding to the vector embeddings of the set of training data and a second particular vector embedding corresponding to the particular vector embedding that represents the one or more particular items of non-textual digital media content; wherein the first set of vector embeddings comprises a first vector embedding corresponding to a vector embedding of one or more first items of the plurality of items and a second vector embedding corresponding to a vector embedding of one or more second items of the plurality of items;

determining a first distance between the second particular vector embedding and the first vector embedding and a second distance between the second particular vector embedding and the second vector embedding;

based at least in part on the first distance and the second distance, generating a first tuned textual content generation model at least in part by tuning a textual content generation model on the one or more first items including first corresponding textual content of the one or more first items;

storing a particular tuned textual content generation model based at least in part on the first tuned textual content generation model;

using the particular tuned textual content generation model to transform one or more unlabeled items of non-textual digital media content to one or more items of corresponding textual content.

14. A computer-implemented method for tuning a pre-existing textual content generation model, comprising:

receiving out-of-domain data and in-domain seed data that comprise items of non-textual digital media content;

applying one or more pre-trained machine learning models to (i) data from the out-of-domain data to extract out-of-domain embeddings, and (ii) data from the in-domain seed data to extract in-domain embeddings;

grouping, into a plurality of groups, at least some out-of-domain embeddings of the out-of-domain embeddings based at least in part on distances between the at least some out-of-domain embeddings and the in-domain embeddings; and tuning the pre-existing textual content generation model using out-of-domain data associated with each group of the plurality of groups starting with those groups having out-of-domain embeddings that are further from the in-domain embeddings before progressively finetuning the model on out-of-domain data associated with other groups of the plurality of groups having out-of-domain embeddings that are closer to the in-domain embeddings.

15. The computer-implemented method of claim 14, further comprising sampling out-of-domain embeddings, based on distance from the in-domain embeddings, up to a stopping criterion to define a tuning dataset; wherein said sampling treats in-domain embeddings as a query and matches the in-domain embeddings to a most similar out-of-domain embedding using a distance function.

16. The computer-implemented method of claim 15, wherein the distance function is one of a cosine distance, a Euclidean distance, a Pearson correlation coefficient, a Manhattan distance, a Minkowski distance, a hamming distance, a Chebyshev distance, a Jaccard distance, a Haversine distance, a Sorensen-Dice distance, or any combination or function thereof.

17. The computer-implemented method of claim 14, wherein the extracted out-of-domain embeddings overlap with the in-domain embeddings on one or more characteristics.

18. The computer-implemented method of claim 14, wherein the out-of-domain data and the in-domain seed data comprises one or more of audio files, video files, image files, images of handwriting, or audiovisual files.

19. The computer-implemented method of claim 14, wherein the in-domain seed data is audio data representing one minute of audio recordings plus or minus up to 30 seconds, and wherein the out-of-domain data is audio data representing greater than six thousand hours of audio data plus or minus up to 3000 hours.

20. The computer-implemented method of claim 14, further comprising using the finetuned textual generation model to transform one or more unlabeled items of non-textual digital media content to one or more items of corresponding textual content.

21. The computer-implemented method of claim 14, wherein the out-of-domain data comprises items of non-textual digital media content labeled with corresponding textual content and one or more background characteristics that indicate an origination category of a plurality of candidate origination categories of the item of non-textual digital media content, and wherein said applying one or more pre-trained machine learning models further comprises:

using the background characteristics of the out-of-domain data to train another machine learning model for generating, from initial out-of-domain embeddings, a prediction of the one or more background characteristics;

extracting domain-calibrated embeddings as said out-of-domain embeddings from a hidden layer of the other machine learning model.

22. The computer-implemented method of claim 21, wherein the background characteristics indicate an origination category of a plurality of candidate origination categories of the item of non-textual digital media content.

23. The computer-implemented method of claim 22, wherein the one or more background characteristics include a content purpose, a manner of content delivery, a source of content, a location where the content is stored or originated, a gender of a speaker of the content, a dialect of a speaker of the content, or an age of a speaker of the content.

24. A system comprising:

one or more processors;

one or more non-transitory computer-readable media storing instructions, which, when executed by the system, cause the system to perform a set of actions for tuning a pre-existing textual content generation model, the set of actions comprising:

receiving out-of-domain data and in-domain seed data that comprise items of non-textual digital media content;

applying one or more pre-trained machine learning models to (i) data from the out-of-domain data to extract out-of-domain embeddings, and (ii) data from the in-domain seed data to extract in-domain embeddings;

grouping, into a plurality of groups, at least some out-of-domain embeddings of the out-of-domain embeddings based at least in part on distances between the at least some out-of-domain embeddings and the in-domain embeddings; and tuning the pre-existing textual content generation model using out-of-domain data associated with each group of the plurality of groups starting with those groups having out-of-domain embeddings that are further from the in-domain embeddings before progressively finetuning the model on out-of-domain data associated with other groups of the plurality of groups having out-of-domain embeddings that are closer to the in-domain embeddings.

* * * * *